(12) United States Patent
Hayashi et al.

(10) Patent No.: US 8,767,518 B2
(45) Date of Patent: Jul. 1, 2014

(54) OBJECTIVE LENS ELEMENT AND OPTICAL PICKUP DEVICE

(75) Inventors: Katsuhiko Hayashi, Nara (JP);
Yasuhiro Tanaka, Hyogo (JP);
Michihiro Yamagata, Osaka (JP);
Fumitomo Yamasaki, Nara (JP)

(73) Assignee: Panasonic Corporation, Kadoma-shi (JP)

( * ) Notice: Subject to any disclaimer, the term of this patent is extended or adjusted under 35 U.S.C. 154(b) by 18 days.

(21) Appl. No.: 13/248,038

(22) Filed: Sep. 29, 2011

(65) Prior Publication Data
US 2012/0075978 A1 Mar. 29, 2012

(30) Foreign Application Priority Data

Sep. 29, 2010 (JP) ................................ 2010-219876
Jun. 27, 2011 (JP) ................................ 2011-142134
Aug. 8, 2011 (JP) ................................ 2011-173428

(51) Int. Cl.
*G11B 7/12* (2012.01)
(52) U.S. Cl.
USPC ............. 369/112.23; 369/112.03; 369/112.12
(58) Field of Classification Search
USPC ............. 369/112.01, 112.03, 112.11, 112.12, 369/112.13, 112.23
See application file for complete search history.

(56) References Cited

U.S. PATENT DOCUMENTS

| | | | |
|---|---|---|---|
| 7,050,379 B2 * | 5/2006 | Takahashi et al. | 369/112.08 |
| 7,468,942 B2 * | 12/2008 | Koike et al. | 369/112.07 |
| 8,023,389 B2 * | 9/2011 | Nakamura | 369/112.08 |
| 2004/0160885 A1 * | 8/2004 | Kimura | 369/112.09 |
| 2004/0213136 A1 * | 10/2004 | Arai et al. | 369/112.23 |
| 2005/0094537 A1 * | 5/2005 | Ikenaka et al. | 369/112.05 |
| 2006/0146422 A1 * | 7/2006 | Koike | 359/742 |
| 2006/0280061 A1 * | 12/2006 | Koreeda et al. | 369/44.23 |
| 2010/0054109 A1 * | 3/2010 | Yasui | 369/112.27 |
| 2010/0260031 A1 * | 10/2010 | Ono et al. | 369/112.23 |
| 2011/0007622 A1 * | 1/2011 | Mimori | 369/112.23 |

FOREIGN PATENT DOCUMENTS

| | | |
|---|---|---|
| JP | H10-010308 A | 1/1998 |
| JP | 2002-324333 A | 11/2002 |
| JP | 2005-129227 A | 5/2005 |
| JP | 2005-158217 A | 6/2005 |
| JP | 2005-243151 A | 9/2005 |
| JP | 2005-310315 A | 11/2005 |
| WO | WO-2009-016847 A1 | 2/2009 |

* cited by examiner

*Primary Examiner* — Thomas Alunkal
(74) *Attorney, Agent, or Firm* — Judge Patent Associates

(57) ABSTRACT

An objective lens element that can suppress occurrence of an aberration is disclosed. Sawtooth-like diffraction structures having different height and cycles (pitches) are provided on an inner part R21 and an outer part R22, respectively. A curved surface M211 extending at an intermediate level of recesses and projections of the sawtooth-like diffraction structure provided on the inner part R21, and a curved surface M212 extending at an intermediate level of recesses and projections of the sawtooth-like diffraction structure provided on the outer part R22 are smoothly connected to each other. Even when wavelength of the light source and/or the environmental temperature change, a phase shift does not occur between the inner part R21 and the outer part R22, and a decrease in diffraction efficiency and occurrence of an aberration can be suppressed.

4 Claims, 20 Drawing Sheets

OBJECTIVE LENS ELEMENT AND OPTICAL PICKUP DEVICE

CROSS REFERENCE TO RELATED APPLICATION

The disclosure of Japanese Patent Application No. 2010-219876 filed on Sep. 29, 2010, Japanese Patent Application No. 2011-142134 filed on Jun. 27, 2011, and Japanese Patent Application No. 2011-173428 filed on Aug. 8, 2011, is incorporated herein by reference.

BACKGROUND OF THE INVENTION

1. Field of the Invention

The present invention relates to an objective lens element used for performing at least one of recording, reproducing, or erasing of information on an information recoding surface of an optical information storage medium, and an optical pickup device including the objective lens element.

2. Description of the Background Art

In recent years, research and development has been actively carried out concerning high-density optical discs that have an increased recording density by using a blue laser beam with a wavelength of about 400 nm and thus have an improved storage capacity. One of the standards of such high-density optical discs is Blu-Ray Disc (registered trademark; hereinafter, referred to as "BD") in which the image side numerical aperture (NA) of an objective lens is set to about 0.85 and the thickness of a protective base plate on an information recoding surface of an optical disc is set to about 0.1 mm.

Other than BD, DVD (protective base plate thickness: about 0.6 mm) for which a red laser beam with a wavelength of about 680 nm is used, and CD (protective base plate thickness: about 1.2 mm) for which an infrared laser beam with a wavelength of about 780 nm is used also exist. Various objective lenses that are compatible with three types of standards of these discs have been proposed.

For example, Japanese Patent No. 3993870 discloses an optical element and an optical pickup device that are compatible with the three types of the standards of BD, DVD, and CD. An objective lens disclosed in Japanese Patent No. 3993870 is provided with a stair-like diffraction structure (also referred to as binary type diffraction structure) in which stair-like steps are periodically arranged. The height of each step is set such that a difference in optical path of about 1.25 wavelengths is provided to a light beam having a shortest designed wavelength. In addition, one periodic structure consists of four steps that are consecutive in a radial direction (the height from a base surface is 0 to 3 times that of a unit step).

Since such a step structure is provided, the diffraction efficiency of a +1st order diffracted light beam can be at its maximum when a light beam of a wavelength for BD is used, and the diffraction efficiency of a −1st order diffracted light beam can be at its maximum when a light beam of a wavelength for DVD is used. Thus, by using change in an angle of diffraction with respect to a wavelength, it is possible to compensate for a spherical aberration that occurs due to differences in wavelength and disc base material thickness when changing between BD and DVD.

Further, Japanese Laid-Open Patent Publication No. 2005-243151 discloses an optical element that is compatible with a plurality of standards and that is provided with sawtooth-like diffraction structures having different depths.

FIG. 20 is a cross-sectional view of a principal part of conventional sawtooth-like diffraction structures disclosed in Japanese Laid-Open Patent Publication No. 2005-243151.

In Japanese Laid-Open Patent Publication No. 2005-243151, in order to increase the diffraction order (diffraction angle) in an outer region, a cycle (pitch) PB and a depth HB of a sawtooth-like diffraction structure provided in a region R22 on the outer side are set so as to be twice that of a cycle (pitch) PA and a depth HA of a sawtooth-like diffraction structure provided in a region R21 on the inner side.

As described in Japanese Laid-Open Patent Publication No. 2005-243151, in a configuration in which the shape of the diffraction structure is different from region to region, it is necessary that the phases of light beams passing outside and inside the boundary between adjacent regions be made to coincide, in order that a light beam diffracted at each region is converged on one spot.

However, in the configuration in Japanese Laid-Open Patent Publication No. 2005-243151, when a designed wavelength or a material refractive index changes, a phase mismatch occurs between a light beam diffracted by the region R21 and a light beam diffracted by the region R22.

Specifically, in the configuration in Japanese Laid-Open Patent Publication No. 2005-243151, the height and the cycle of the grating provided in the region R22 on the outer side are set so as to be twice that of the height and the cycle of the grating provided in the region R21 on the inner side, but the direction of the diffraction by the region R21 is the same as the direction of the diffraction by the region R22. In this case, the phase of a light beam having passed through a point C21 near the boundary between the regions R21 and R22 coincides with the phase of a light beam having passed through a point C22 near the boundary when a difference in optical path length caused by the grating height HA is an integral multiple of the wavelength, in other words, when a phase difference is an integral multiple of $2\pi$.

However, in the case of mass-produced products such as optical disc devices, an inevitable variation of several nanometers occurs in the wavelength of a semiconductor laser used as a light source. In addition, due to a difference in temperature of operating environment, the wavelength also changes. Even when a use wavelength is deviated from a design center, the direction of diffraction depends on the relation between the grating pitch and the wavelength. Thus, the direction of diffraction by each region is the same, and a disagreement of the direction of diffraction does not occur between the regions, but phase matching is not kept.

Here, in FIG. 20, the case is assumed where the upper surface of the diffraction structure is an exit surface and light beams having the same phase are incident on the diffraction structure from the lower side in FIG. 20. On a base surface BA shown in FIG. 20, the phases of the light beams are the same. When the light beams travel across the base surface BA in the upward direction in the drawing in a glass material having a refractive index different from that of the air, a phase difference occurs between the phase of the light beams travelling in the grass material and the phase of light travelling in the air, due to the influence of the sawtooth-like diffraction grating. When light beams passing in a range of from the points C20 to C22 shown in FIG. 20 are considered, a light beam having passed through the point C20 is outputted to the air immediately after passing across the base surface BA, and thus no phase difference occurs. In the range of from the points C20 to C22, a light beam passing through the point C21 slightly inward of the point C22 travels in the glass material for the longest distance after passing across the base surface BA. Thus, the light beam having passed through the point C21 has a maximum phase difference from the phase in the case of traveling in the air. The phase difference changes in proportion to the wavelength, and the change amount of the phase difference of the light beam passing through the point C21 is at its maximum in the range of from the points C20 to C22. The phase change amount of a diffracted light beam can be represented by the average in the range of from the points C20 to C22, and the phase difference provided to an incident light beam by the diffraction structure in the region R21 is equal to that in the case where the glass material extends to a line M211 (the center line of the amplitudes of the sawteeth in the region R21) shown in FIG. 20. Similarly, the phase difference provided to an incident light beam by the diffraction structure in the region R22 on the outer side is equal to that in the case where the glass material extends to a line M212 (the center line of the amplitudes of the sawteeth in the region R22) shown in FIG. 20.

Since a phase difference between outputted light beams that occurs when it is assumed that there is an average exit surface along the line M211 in FIG. 20 is not the same as a phase difference between outputted light beams that occurs when it is assumed that an average exit surface along the line M212, a phase change amount provided when the wavelength of an incident light beam changes is different between the regions R21 and R22. Thus, when the wavelength of an incident light beam changes, the diffraction direction of a light beam diffracted by the region R21 is the same as the diffraction direction of a light beam diffracted by the region R22, but a phase shift occurs between these light beams, leading to a decrease in diffraction efficiency. Further, when a light beam having passed through the region R21 and a light beam having passed through the region R22 are converged, an aberration occurs.

As described above, in the conventional art, objective lenses in which diffraction structures having different shapes are provided in regions, respectively, have been proposed. However, a phase shift caused by an error of the wavelength of a light source when a light beam diffracted by each region is converged is not taken into consideration in such designs.

SUMMARY OF THE INVENTION

Therefore, an object of the present invention is to provide: an objective lens element that ensures compatibility with optical information storage media having different use wavelengths by using a plurality of types of diffraction structures having different shapes and that can suppress occurrence of an aberration even when an error of the wavelength of a light source occurs; and an optical pickup device including the objective lens element.

The present invention is directed to an objective lens element that has optical function surfaces on an incident side and an exit side, that converges a first incident light beam of a wavelength $\lambda_1$ through a base plate having a thickness $t_1$ to form a spot, and that converges a second incident light beam of a wavelength $\lambda_2$ longer than the wavelength $\lambda_1$ through a base plate having a thickness $t_2$ larger than the thickness $t_1$ to form a spot. At least either one of the optical function surfaces is divided into an inner part that includes a rotational symmetry axis and through which the first and second incident light beams that substantially contribute to spot formation pass, and an outer part that is a ring-shaped region surrounding the inner part and through which only the first incident light beam that substantially contributes to spot formation passes.

In the above objective lens element, the inner part and the outer part are provided with sawtooth-like diffraction structures. In the vicinity of a boundary between the inner part and the outer part, a level difference Δd between a curved surface extending at an intermediate level of recesses and projections of the sawtooth-like diffraction structure provided on the inner part and a curved surface extending at an intermediate level of recesses and projections of the sawtooth-like diffraction structure provided on the outer part satisfies the following condition:

$$\Delta d = a \times \lambda_1 / (n_1 - 1),$$

where:
a is an integer; and
$n_1$ is the refractive index of a material forming the objective lens element, with respect to the light beam of the wavelength $\lambda_1$.

Alternatively, in the above objective lens element, a plurality of stair-like diffraction structures is provided on the inner part and a plurality of sawtooth-like diffraction structures is provided on the outer part. In the vicinity of a boundary between the inner part and the outer part, a level difference Δd between a curved surface extending at an intermediate level of recesses and projections of the stair-like diffraction structures provided on the inner part and a curved surface extending at an intermediate level of recesses and projections of the sawtooth-like diffraction structures provided on the outer part satisfies the above condition:

Alternatively, a plurality of stair-like diffraction structures is provided on the inner part and a plurality of stair-like diffraction structures different from those on the inner part is provided on the outer part. In the vicinity of a boundary between the inner part and the outer part, a level difference Δd between a curved surface extending at an intermediate level of recesses and projections of the stair-like diffraction structures provided on the inner part and a curved surface extending at an intermediate level of recesses and projections of the stair-like diffraction structures provided on the outer part satisfies the above condition.

Further, the present invention is directed to an objective lens element that has optical function surfaces on an incident side and an exit side, that converges a first incident light beam of a wavelength $\lambda_1$ through a base plate having a thickness $t_1$ to form a spot, that converges a second incident light beam of a wavelength $\lambda_2$ longer than the wavelength $\lambda_1$ through a base plate having a thickness $t_2$ larger than the thickness $t_1$ to form a spot, and that converges a third incident light beam of a wavelength $\lambda_3$ longer than the wavelength $\lambda_2$ through a base plate having a thickness $t_3$ larger than the thickness $t_2$ to form a spot. At least either one of the optical function surfaces is divided into an inner part that includes a rotational symmetry axis and through which the first to third incident light beams that substantially contribute to spot formation pass, an intermediate part that is a ring-shaped region surrounding the inner part and through which only the first and second incident light beams that substantially contribute to spot formation pass, and an outer part that is a ring-shaped region surrounding the intermediate part and through which only the first incident light beam that substantially contributes to spot formation passes.

In the objective lens element, a plurality of stair-like diffraction structures is provided on the inner part, a plurality of stair-like diffraction structures different from those on the inner part is provided on the intermediate part, and a plurality of sawtooth-like diffraction structures is provided on the outer part. In the vicinity of a boundary between the inner part and the intermediate part, a level difference $\Delta d_1$ between a curved surface extending at an intermediate level of recesses and projections of the stair-like diffraction structures provided on the inner part and a curved surface extending at an intermediate level of recesses and projections of the stair-like diffraction structures provided on the intermediate part and a level difference $\Delta d_2$, in the vicinity of a boundary between the intermediate part and the outer part, the curved surface extending at the intermediate level of the recesses and the projections of the stair-like diffraction structures provided on the intermediate part and a curved surface extending at an intermediate level of recesses and projections of the sawtooth-like diffraction structures provided on the outer part satisfy the following conditions:

$$\Delta d_1 = a \times \lambda_1/(n_1-1);$$

$$\Delta d_1 = b \times \lambda_2/(n_2-1); \text{ and}$$

$$\Delta d_2 = c \times \lambda_1/(n_1-1),$$

where:
a is an integer;
b is an integer (b is an integer closest to $a \times \lambda_1/\lambda_2$);
c is an integer;
$n_1$ is the refractive index of a material forming the objective lens element, with respect to the light beam of the wavelength $\lambda_1$; and
$n_2$ is the refractive index of the material forming the objective lens element, with respect to the light beam of the wavelength $\lambda_2$.

Further, the present invention is directed to an optical pickup device comprising: a first light source for emitting a light beam of the wavelength $\lambda_1$; a second light source for emitting a light beam of the wavelength $\lambda_2$; any one of the above-described objective lens elements; and a detection element for detecting a light beam reflected by an information storage medium that is an optical disc.

According to the present invention, an objective lens element that is compatible with optical information storage media having different use wavelengths and that can suppress occurrence of an aberration even when an error of the wavelength of a light source occurs, and an optical pickup device including the objective lens element can be realized.

These and other objects, features, aspects and advantages of the present invention will become more apparent from the following detailed description of the present invention when taken in conjunction with the accompanying drawings.

DESCRIPTION OF THE PREFERRED EMBODIMENTS (Embodiment 1)

Figure 1:
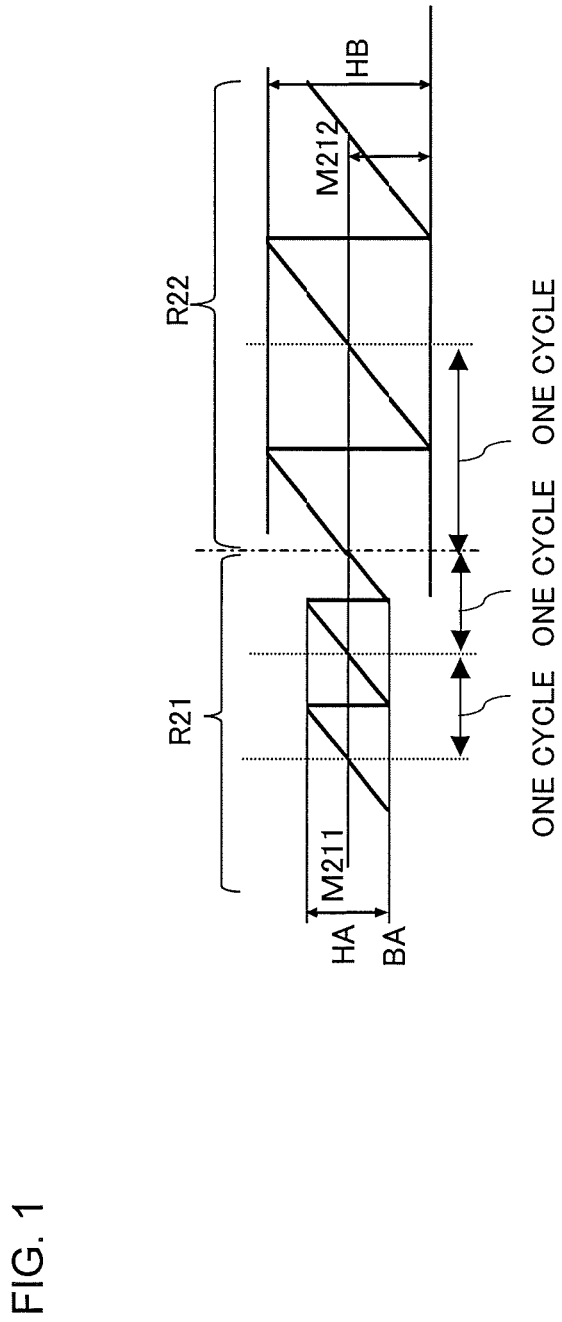
FIG. 1 is a cross-sectional view of a principal part of sawtooth-like diffraction structures provided in an objective lens element according to Embodiment 1.

FIG. 1 is a cross-sectional view of a principal part of sawtooth-like diffraction structures provided in an objective lens element according to Embodiment 1

The sawtooth-like diffraction structures shown in FIG. 1 serves to ensure compatibility with standards of a plurality of optical information storage media for which light beams of different wavelengths are used, and are provided on an optical function surface on an incident or exit side of the objective lens element. The optical function surface on which the sawtooth-like diffraction structures are provided is divided into an inner part R21 including a rotational symmetry axis (optical axis), and an outer part R22 that is a ring-shaped region surrounding the inner part R21. The inner part R21 and the outer part R22 are provided with sawtooth-like diffraction structures having different heights and cycles (pitches). Specifically, the depth HA of the sawtooth-like diffraction structure provided on the inner part R21 is such a depth that the diffraction efficiency of a +1st order diffracted light beam is at its maximum when a light beam of a wavelength $\lambda_1$ is incident. Meanwhile, the depth HB of the sawtooth-like diffraction structure provided on the outer part R22 is such a depth that the diffraction efficiency of a +2nd order diffracted light beam is at its maximum when the light beam of a wavelength $\lambda_1$ is used.

The diffraction structures shown in FIG. 1 are characterized by a manner of connection near the boundary (an alternate long and short dash line in FIG. 1) between the inner part R21 and the outer part R22. In the present embodiment, a curved surface M211 extending at an intermediate level of recesses and projections of the sawtooth-like diffraction structure provided on the inner part R21 is smoothly connected to a curved surface M212 extending at an intermediate level of recesses and projections of the sawtooth-like diffraction structure provided on the outer part R22. Here, the intermediate level of the recesses and the projections of the diffraction structure means the position of an imaginary surface located at the intermediate position between an envelope including the tops of the projections of the diffraction structure; and an envelope including the deepest parts of the recesses of the diffraction structure. In other words, on the cross section shown in FIG. 1, the intermediate level of the recesses and the projections of the diffraction structure means a level connecting the centers of the amplitudes of a sawtooth wave that forms the contour of the sawtooth-like diffraction structure.

The curved surfaces M211 and M212 agree with an average phase surface of the inner part R21 and an average phase surface of the outer part R22, respectively. Thus, when the sawtooth-like diffraction structure on the inner part R21 and the sawtooth-like diffraction structure on the outer part R22 are connected as described above, even if the wavelength of a light source changes and/or material refractive index changes due to a change of environmental temperature, a phase shift does not occur between the inner part R21 and the outer part R22. Thus, even when the wavelength of the light source and/or the environmental temperature change, a decrease in diffraction efficiency and occurrence of an aberration can be suppressed.

In the present embodiment, the curved surface M211 and the curved surface M212 are smoothly connected to each other. However, it suffices that the phases of light beams passing through the inner part R21 and the outer part R22 are the same, and thus a step may be provided at the boundary. In this case, it suffices that the height of the step at the boundary satisfies the following condition.

$$\Delta d = a \times \lambda_1 / (n_1 - 1) \tag{1}$$

Here, $\Delta d$ is the level difference, in the vicinity of the boundary between the inner part and the outer part, between the curved surface extending at the intermediate level of the recesses and the projections of the sawtooth-like diffraction structure provided on the inner part and the curved surface extending at the intermediate level of the recesses and the projections of the sawtooth-like diffraction structure provided on the outer part, a is an integer, $\lambda_1$ is a shortest designed wavelength, and $n_1$ is the refractive index of a material forming the objective lens element, with respect to the light beam of the wavelength $\lambda_1$.

(Embodiment 2)

Figure 2:
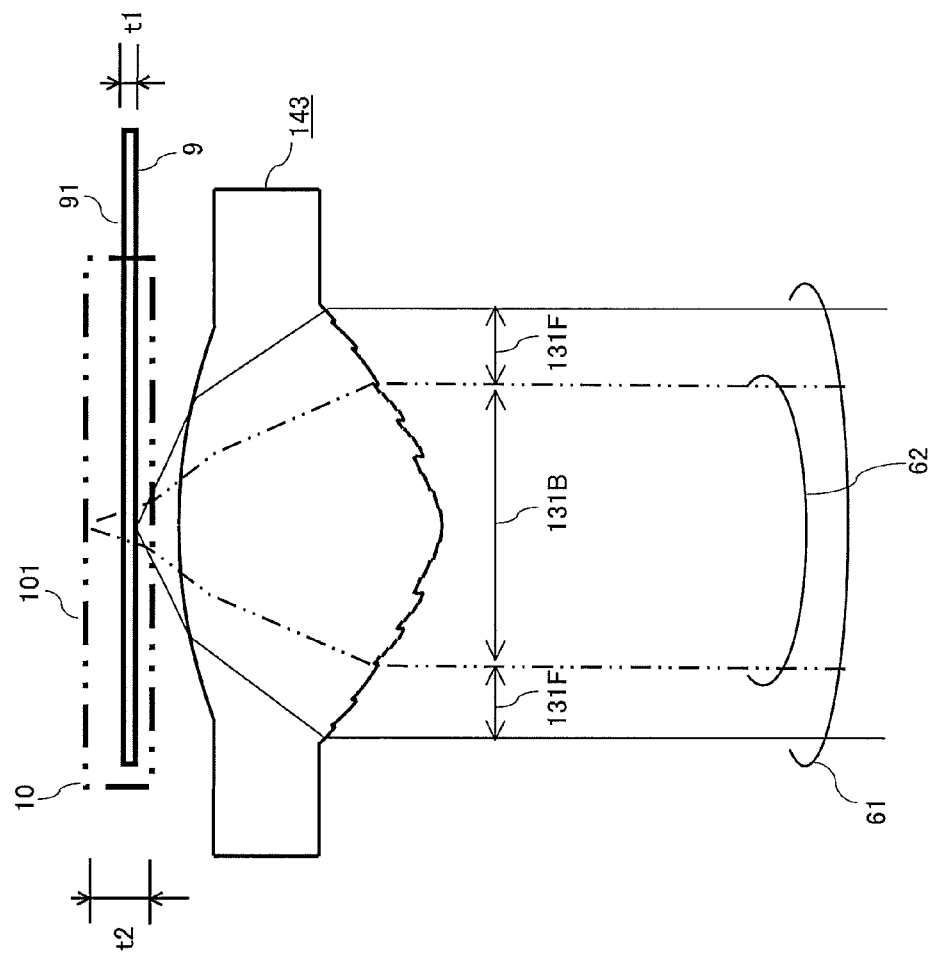
FIG. 2 is a schematic configuration diagram of an objective lens element according to Embodiment 2.

FIG. 2 is a schematic configuration diagram of an objective lens element according to Embodiment 2.

An objective lens element 143 according to Embodiment 2 is compatible with the BD standard and the DVD standard, converges a blue light beam of a wavelength $\lambda_1$ (about 400 nm) on an information recoding surface through a base plate having a thickness of 0.1 mm to form a spot thereon, and converges a red light beam of a wavelength $\lambda_2$ (about 680 nm) on an information recoding surface through a base plate having a thickness of 0.6 mm to form a spot thereon. An incident side optical function surface of the objective lens element 143 is divided into an inner part 131B including a rotational symmetry axis (optical axis) and a ring-shaped outer part 131F surrounding the inner part 131B. The inner part 131B is provided with a stair-like diffraction structure that consists of periodic stair-like steps, and the outer part 131F is provided with a sawtooth-like diffraction structure. The stair-like diffraction structure of the inner part 131B is a periodic structure in which one cycle consists of 4-level stair-like steps. The step height of the stair-like diffraction structure of the inner part 131B is set such that the diffraction efficiency of a +1st order diffracted light beam is at its maximum when the blue light beam of the wavelength $\lambda_1$ is used and the diffraction efficiency of a −1st order diffracted light beam is at its maximum when the red light beam of the wavelength $\lambda_2$ is used. The step height of the sawtooth-like diffraction structure on the outer part 131F is set such that the diffraction efficiency of a +3rd order diffracted light beam is at its maximum when the blue light beam of the wavelength $\lambda_1$ is used.

In the present embodiment, the step height of the sawtooth-like diffraction structure on the outer part 131F is set such that the diffraction efficiency of a +3rd order diffracted light beam diffracted by the outer part 131F is at its maximum, but this diffraction order may be a diffraction order other than +3rd order. However, the outer part 131F is a region dedicated for BD, and thus preferably has an aperture limiting function for adjusting an effective NA, with respect to the light beam of the wavelength $\lambda_2$ for DVD. In other words, it is desired that a red light beam of the wavelength $\lambda_2$ incident on the outer part 131F does not contribute to a spot and does not return as stray light onto a photodetector. The stray light refers to light that is reflected by a surface of an optical disc, a recording surface of the optical disc, an optical component on an optical path, a lens surface, or the like and influences the intensity of signal light on the photodetector.

Figure 3:
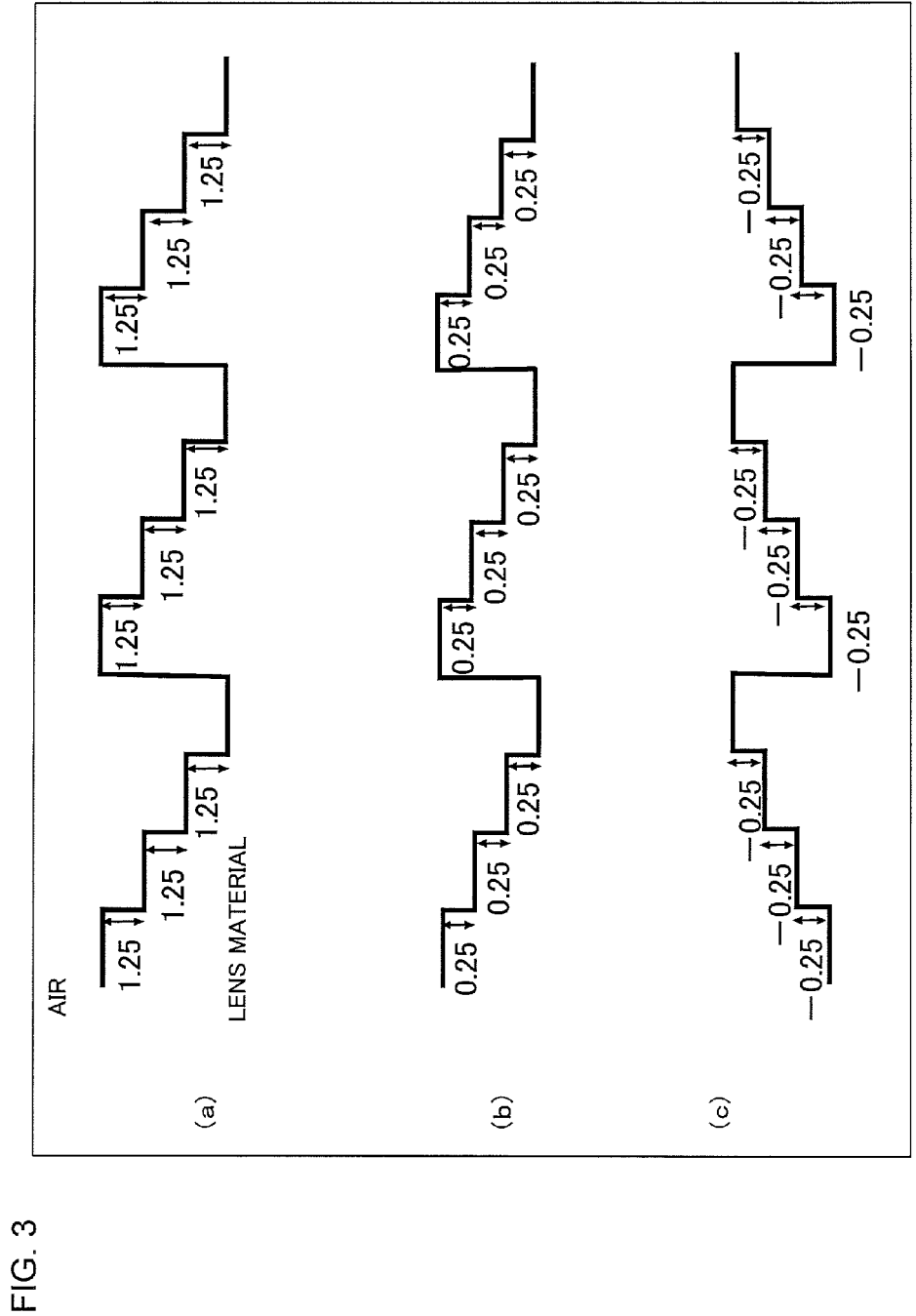
FIG. 3 is a diagram illustrating a stair-like diffraction structure provided on an inner part of the objective lens element shown in FIG. 2.

FIG. 3 is a diagram illustrating the stair-like diffraction structure provided on the inner part of the objective lens element shown in FIG. 2. FIG. 3(a) shows a theoretical shape of the stair-like step structure provided on the optical function surface of the objective lens element. FIG. 3(b) shows an amount of phase change provided to the light beam of the wavelength $\lambda_1$ for BD, and FIG. 3(c) shows an amount of phase change provided to the light beam of the wavelength $\lambda_2$ for DVD.

The stair-like diffraction structure shown in FIG. 3(a) is a periodic structure in which one cycle consists of consecutive 4-level steps. The height of one step is set such that a difference in optical path that is about 1.25 times as long as the wavelength $\lambda_1$ is provided to the blue light beam for BD. When the light beam of the wavelength $\lambda_1$ is incident on the stair-like diffraction structure, a phase difference of about 0.25 wavelength is provided to the light beam of the wavelength $\lambda_1$ each time the step height is increased by one step, as shown in FIG. 3(b). In other words, the amount of phase change with respect to the light beam of the wavelength $\lambda_1$ is about ½π per step. In this case, the diffraction efficiency of the +1st order diffracted light beam is the highest. Meanwhile, when the light beam of the wavelength $\lambda_2$ is incident on the stair-like diffraction structure shown in FIG. 3(a), one step provides a difference in optical path of about 0.75 wavelength to the light beam of the wavelength $\lambda_2$. Thus, the stair-like diffraction structure provides a phase difference of about −0.25 wavelength to the light beam of the wavelength $\lambda_2$ each time the step height is increased by one step, as shown in FIG. 3(c). In other words, the amount of phase change with respect to the light beam of the wavelength $\lambda_2$ is about −½π per step. As described above, the stair-like diffraction structure shown in FIG. 3(a) serves as an optical element having positive power with respect to the light beam of the wavelength $\lambda_1$ and serves as an optical element having negative power with respect to the light beam of the wavelength $\lambda_2$.

Figure 4:
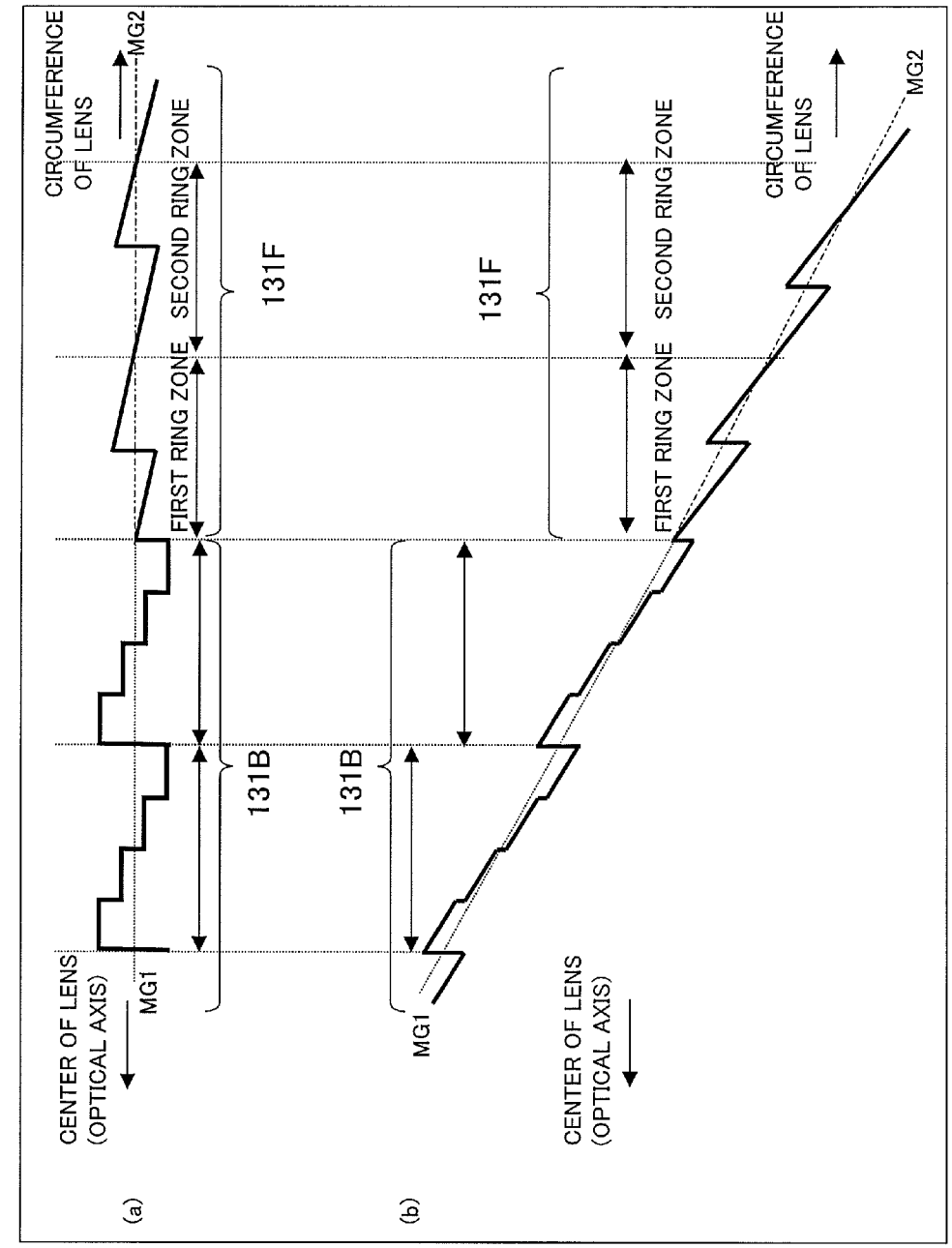
FIG. 4 is a diagram illustrating diffraction structures provided near the boundary between the inner part and an outer part of the objective lens element shown in FIG. 2.

FIG. 4 is a diagram illustrating diffraction structures provided near the boundary between the inner part and the outer part of the objective lens element shown in FIG. 2. FIG. 4(a) is a diagram in which a base aspheric surface is removed and only the diffraction structures are provided on a planar surface for easy understanding. FIG. 4(b) is a diagram in which the diffraction structures are provided on the base aspheric surface of the objective lens element.

In FIG. 4, a curved surface MG1 (indicated by straight lines in FIG. 4) is a curved surface extending at an intermediate level of recesses and projections of the stair-like diffraction structure provided on the inner part 131B, and a curved surface MG2 (indicated by alternate long and short dash lines in FIG. 4) is a curved surface extending at an intermediate level of recesses and projections of the sawtooth-like diffraction structure provided on the outer part 131F. Here, the curved surface extending at the intermediate level of the recesses and the projections of the stair-like diffraction structure means an imaginary curved surface located at an intermediate position between an envelope including the surfaces of highest steps and an envelope including the surfaces of lowest steps.

In the present embodiment, the curved surface MG1 and the curved surface MG2 are smoothly connected to each other in the vicinity of the boundary between the inner part 131B and the outer part 131F. By forming the diffraction structures in this manner, even when the wavelength of a light source changes and/or the refractive index of the lens material changes due to a temperature change, a phase shift is prevented from occurring between a light beam passing through the inner part 131B and a light beam passing through the outer part 131F. As a result, a decrease in diffraction efficiency that is caused by a phase mismatch can be prevented, and occurrence of an aberration can be suppressed.

Figure 5:
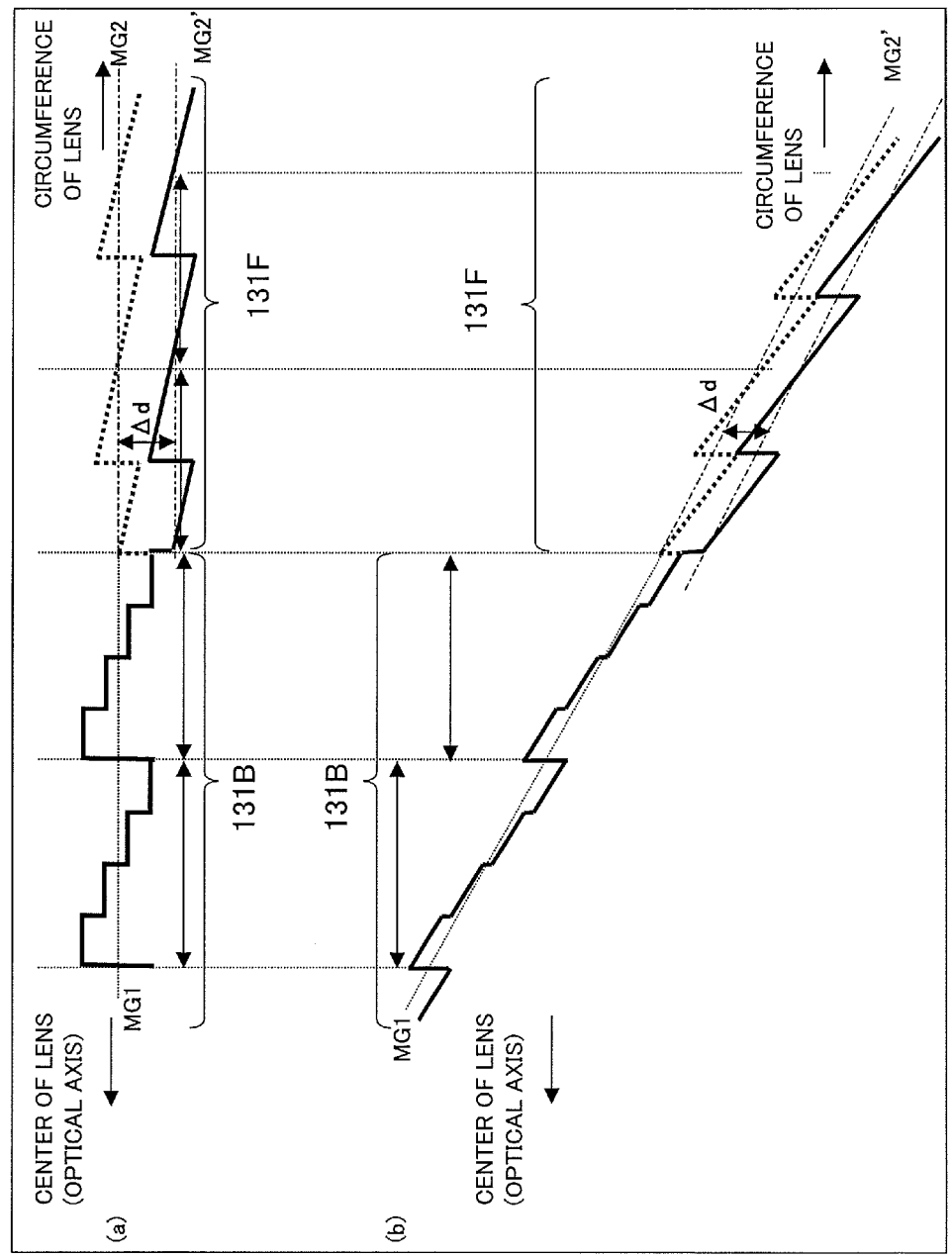
FIG. 5 is a diagram illustrating a modified example of Embodiment 2.

FIG. 5 is a diagram illustrating a modified example of Embodiment 2. FIG. 5(a) is a diagram in which a base aspheric surface is removed and only diffraction structures are provided on a planar surface for easy understanding. FIG. 5(b) is a diagram in which the diffraction structures are provided on the base aspheric surface of the objective lens element.

In FIG. 5, a curved surface MG2' is a curved surface extending at an intermediate level of the recesses and the projections of the sawtooth-like diffraction structure provided on the outer part 131F. In the example in FIG. 5, in the vicinity of the boundary between the inner part 131B and the outer part 131F, the curved surface MG1 and the curved surface MG2' are connected to each other through a step having a height $\Delta d$.

The height $\Delta d$ of the step satisfies the following condition, which is repeated from earlier.

$$\Delta d = a \times \lambda_1 / (n_1 - 1) \tag{1}$$

Here,
a is an integer, and
$n_1$ is the refractive index of a material forming the objective lens element, with respect to the light beam of the wavelength $\lambda_1$.

When the height $\lambda d$ of the step where the curved surface MG1 and the curved surface MG2' are connected to each other is set so as to satisfy the conditions of Equation (1), even if the wavelength of the light source and/or the material refractive index change, a phase mismatch does not occur between a light beam having passed through the inner part 131B and a light beam having passed through the outer part 131F. In addition, adjustment of the height $\lambda d$ makes it possible to provide, to the entire objective lens element, a function as a phase step for reducing the amount of an aberration occurring due to a change of the wavelength of the light source and/or a temperature change.

Figure 6:
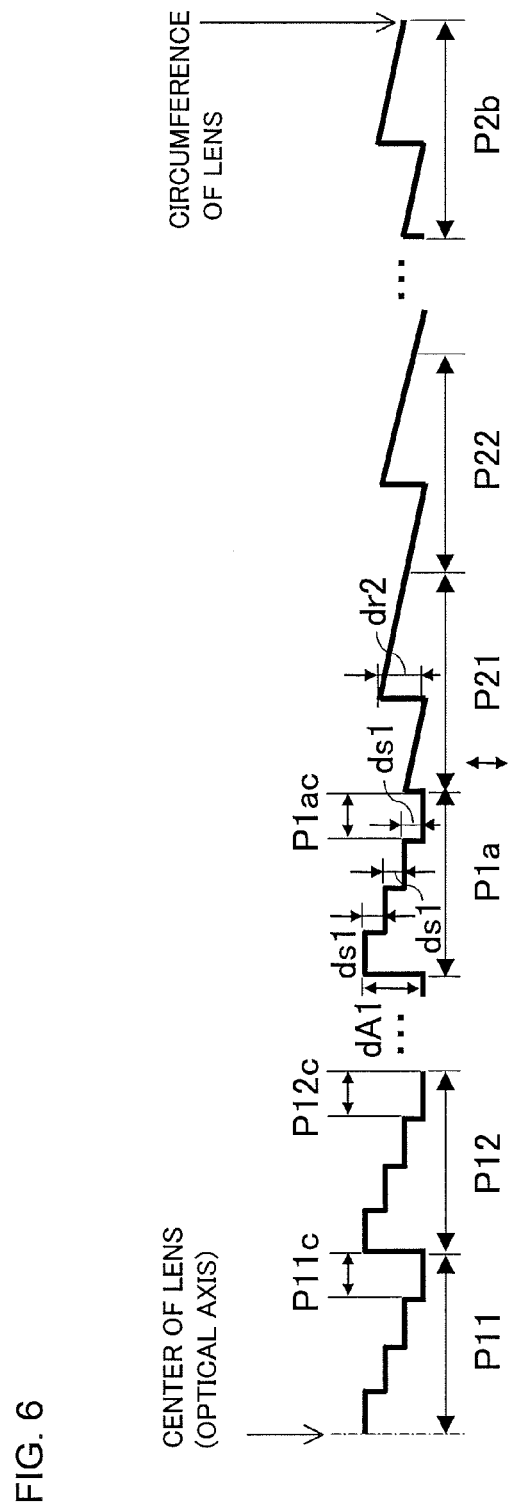
FIG. 6 is a diagram illustrating pitches and depths of the diffraction structures provided in the objective lens element according to Embodiment 2.

FIG. 6 is a diagram illustrating pitches and depths of the diffraction structures provided in the objective lens element according to Embodiment 2.

The objective lens element according to Embodiment 2 preferably satisfies the following conditions.

$$3 \times P1ac < P1a < 5 \times P1ac \tag{2}$$

$$0.3 \times P1a/n < P21/m < 1.5 \times P1a/n \tag{3}$$

$$P21 > 2 \times P2b \tag{4}$$

Here,
P1ac is the pitch of the outermost step of the stair-like diffraction structure located at the outermost portion of the inner part,
P1a is the pitch of the stair-like diffraction structure located at the outermost portion of the inner part,
P21 is the pitch of the sawtooth-like diffraction structure located at the innermost portion of the outer part,
P2b is the pitch of the sawtooth-like diffraction structure located at the outermost portion of the outer part,
m is the diffraction order with respect to a light beam of the wavelength $\lambda_1$ incident on the outer part, and
n is the diffraction order with respect to a light beam of the wavelength $\lambda_1$ incident on the inner part.

The conditions (2) and (3) define the relation between the pitch of the outermost stair-like diffraction structure on the inner part 131B and the pitch of the innermost sawtooth-like diffraction structure on the outer part 131F. When P21/m is equal to or lower than 0.3 time that of P1a/n or equal to or higher than 1.5 times that of P1a/n and the condition (2) is not satisfied, the degree of phase change greatly changes between the inner part 131B and the outer part 131F. Thus, a great aberration occurs due to a change of the wavelength and/or a temperature change.

Further, the condition (4) defines the relation between the pitches of the outermost and innermost sawtooth-like diffraction structures on the outer part 131F. Since the depth of the focal point for BD is shallow, chromatic aberration performance is required, and it is preferred to suppress a high-order aberration. When the condition (4) is not satisfied, the chromatic aberration performance of the outer part 131F, which is the region dedicated for BD, deteriorates.

The objective lens element according to Embodiment 2 preferably satisfies the following condition.

$$dr2/m < ds1 < dA1 < 4 \times ds1 \tag{5}$$

Here,
dr2 is the depth of the sawtooth-like diffraction structure on the outer part,
dA1 is the depth of the stair-like diffraction structure on the inner part,
ds1 is the depth of a step of the stair-like diffraction structure on the inner part, and
m is the diffraction order with respect to the light beam of the wavelength $\lambda_1$ incident on the outer part.

The condition (5) defines the relation between the depth of the stair-like diffraction structure on the inner part 131B and the depth of the sawtooth-like diffraction structure on the outer part 131F. When the condition (5) is not satisfied, the diffraction efficiency of the entire objective lens element is decreased when the light beam of the wavelength for BD is used.

Figure 7:
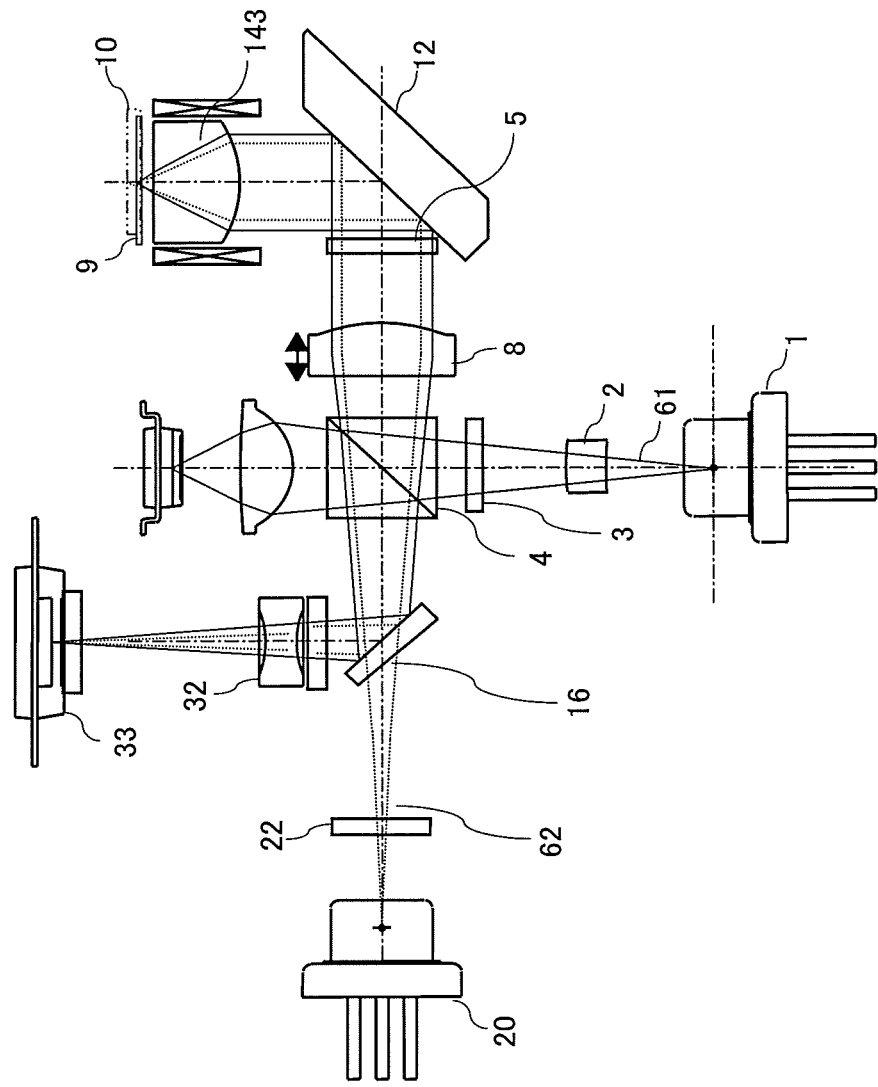
FIG. 7 is a schematic configuration diagram of an optical pickup device including the objective lens element according to Embodiment 2.

FIG. 7 is a schematic configuration diagram of an optical pickup device including the objective lens element according to Embodiment 2.

A blue light beam 61 emitted from a laser beam source 1 passes through a three-beam grating 3 and a relay lens 2, is reflected by a beam splitter 4, and then is converted into a substantially parallel light beam by a collimating lens 8. The collimating lens 8 moves in an optical axis direction. By such movement in the optical axis direction, the collimating lens 8 compensates for a spherical aberration caused by an error of a base material thickness of an optical disc and a difference in base material thickness between information recoding surfaces. The blue light beam 61 having passed through the collimating lens 8 passes through a quarter wavelength plate 5, is reflected by an upward reflection mirror 12, enters the objective lens element 143, and is converged on an information recoding surface of an optical disc 9 to form a desired spot thereon. The blue light beam 61 reflected by the information recoding surface of the optical disc 9 passes through the objective lens element 143 again, is reflected by the upward reflection mirror 12, and passes through the quarter wavelength plate 5, the collimating lens 8, and the beam splitter 4 in order. The blue light beam 61 outputted from the beam splitter 4 is reflected by a beam splitter 16, is converged on a photodetector 33 by a detection lens 32, and is detected as an optical signal.

A red light beam 62 emitted from a laser beam source 20 passes through a three-beam grating 22, the beam splitter 16, and the beam splitter 4, enters the collimating lens 8, and is converted into diffused light. The collimating lens 8 can adjust the parallelism of the red light beam 62 by moving in the optical axis direction. In addition, similarly to the case where the optical disc 9 is used, by moving in the optical axis direction, the collimating lens 8 compensates for a spherical aberration caused by a difference in disc base material thickness, a temperature change, a wavelength change, and the like. The red light beam 62 having passed through the collimating lens 8 passes through the quarter wavelength plate 5, is reflected as diverging light by the upward reflection mirror 12, enters the objective lens element 143, and is converged on an information recoding surface of an optical disc 10 to form a desired spot thereon. The red light beam 62 reflected by the information recoding surface of the optical disc 10 passes through the objective lens element 143 again, is reflected by the upward reflection mirror 12, and passes through the quarter wavelength plate 5, the collimating lens 8, and the beam splitter 4 in order. The red light beam 62 outputted from the beam splitter 4 is reflected by the beam splitter 16, is converged on the photodetector 33 by the detection lens 32, and is detected as an optical signal.

Since the optical pickup device shown in FIG. 7 includes the objective lens element 143 according to Embodiment 2, even when the wavelength of the light source changes and/or the refractive index of the material forming the objective lens element 143 changes due to a temperature change, a decrease in diffraction efficiency and occurrence of an aberration are suppressed, and it is possible to form a stable converged light spot.

(Embodiment 3)

Figure 8:
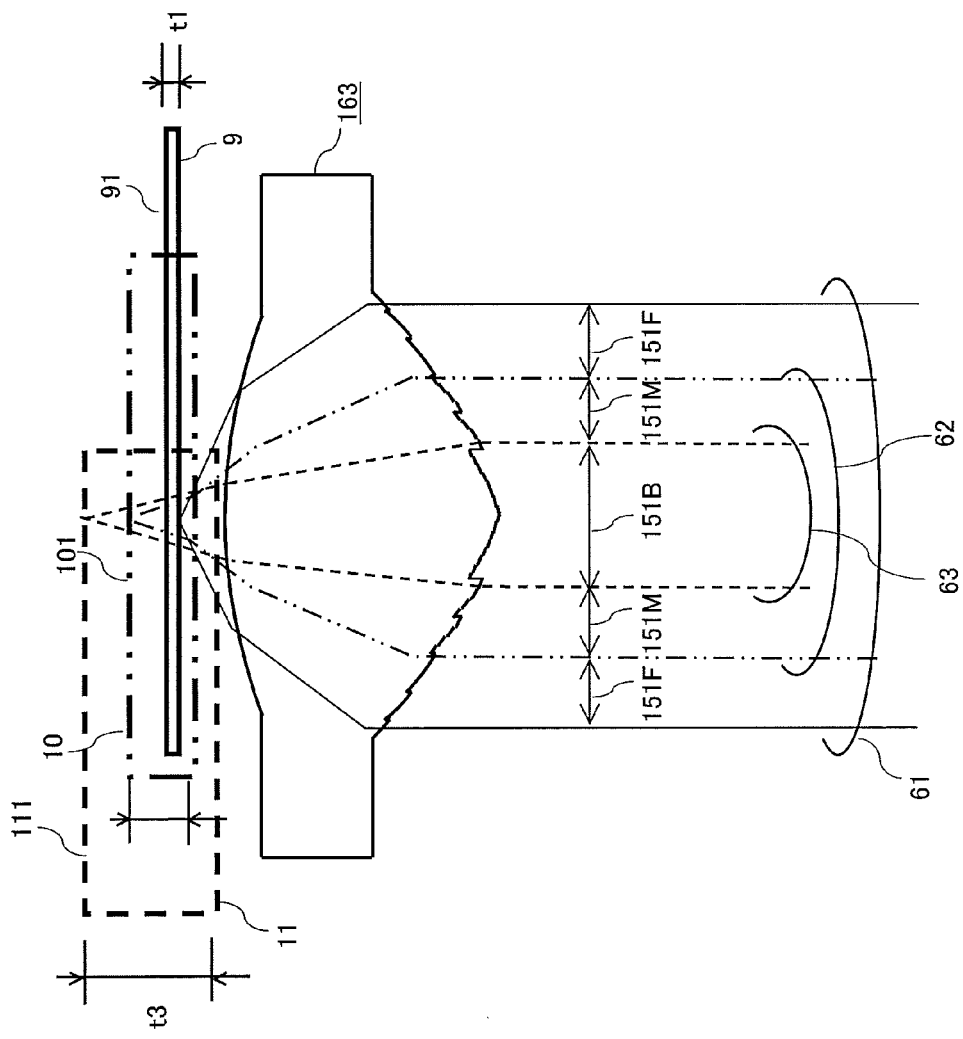
FIG. 8 is a schematic configuration diagram of an objective lens element according to Embodiment 3.

FIG. 8 is a schematic configuration diagram of an objective lens element according to Embodiment 3.

An objective lens element 163 according to Embodiment 3 is compatible with the BD standard, the DVD standard, and the CD standard, converges a blue light beam of a wavelength $\lambda_1$ (about 400 nm) on an information recoding surface through a base plate having a thickness of 0.1 mm to form a spot thereon, converges a red light beam of a wavelength $\lambda_2$ (about 680 nm) on an information recoding surface through a base plate having a thickness of 0.6 mm to form a spot thereon, and converges an infrared light beam of a wavelength $\lambda_3$ (about 780 nm) on an information recoding surface through a base plate having a thickness of 1.2 mm to form a spot thereon.

An incident side optical function surface of the objective lens element 163 is divided into three regions each having a center at a symmetry axis (optical axis), namely, an inner part 151B including the symmetry axis, a ring-shaped intermediate part 151M surrounding the inner part 151B, and a ring-shaped outer part 151F surrounding the intermediate part 151M. The inner part 151B is provided with a stair-like diffraction structure, the intermediate part 151M is provided with a stair-like diffraction structure different from that on the inner part 151B, and the outer part 151F is provided with a sawtooth-like diffraction structure.

The inner part 151B is a region shared by the light beams of the three wavelengths for BD, DVD, and CD. The stair-like diffraction structure provided on the inner part 151B is a periodic structure in which one cycle consists of 8-level steps whose height is monotonically increased step by step. The step height of the stair-like diffraction structure on the inner part 151B is set such that the diffraction efficiency of a +2nd order diffracted light beam is at its maximum when a blue light beam of a wavelength $\lambda_1$ is used, the diffraction efficiency of a −2nd order diffracted light beam is at its maximum when a red light beam of a wavelength $\lambda_2$ is used, and the diffraction efficiency of a −3rd order diffracted light beam is at its maximum when an infrared light beam of a wavelength $\lambda_3$ is used. One cycle of the stair-like diffraction structure provided on the inner part 151B does not necessarily need to consist of 8-level steps, and may consist of 5-, 6-, 7-, or 9-level steps.

The intermediate part 151M is a region shared by the light beams of the two wavelengths for BD and DVD. The stair-like diffraction structure provided on the intermediate part 151M is a periodic structure in which one cycle consists of 4-level steps whose height is monotonically increased step by step. The step height of the stair-like diffraction structure on the intermediate part 151M is set such that the diffraction efficiency of a +1st order diffracted light beam is at its maximum when the blue light beam of the wavelength $\lambda_1$ is used and the diffraction efficiency of a −1st order diffracted light beam is at its maximum when the red light beam of the wavelength $\lambda_2$ is used. An infrared light beam for CD incident on the intermediate part 151M diffuses without contributing to a spot and entering a photodetector as stray light. In other words, the intermediate part 151M exerts an aperture limiting function with respect to the light beam of the wavelength $\lambda_3$ for CD. One cycle of the stair-like diffraction structure provided on the intermediate part 151M does not necessarily need to consist of 4-level steps, and may consist of steps other than 4-level steps.

The height of the sawtooth-like diffraction structure provided on the outer part 151F is set such that the diffraction efficiency of a +3rd order diffracted light beam is at its maximum when the light beam of the wavelength $\lambda_1$ for BD is used. The diffraction order having the maximum diffraction efficiency may be a diffraction order other than +3rd order. However, the outer part 151F is a region dedicated for BD, and thus preferably has an aperture limiting function for adjusting an effective NA, with respect to the light beam of the wavelength $\lambda_2$ for DVD and the light beam of the wavelength $\lambda_3$ for CD. In other words, it is desired that a red light beam of the wavelength $\lambda_2$ and an infrared light of the wavelength $\lambda_3$ that are incident on the outer part 151F do not contribute to a spot and does not return as stray light onto the photodetector. The stray light refers to light that is reflected by a surface of an optical disc, a recording surface of the optical disc, an optical component on an optical path, a lens surface, or the like and influences the intensity of signal light on the photodetector.

Figure 9:
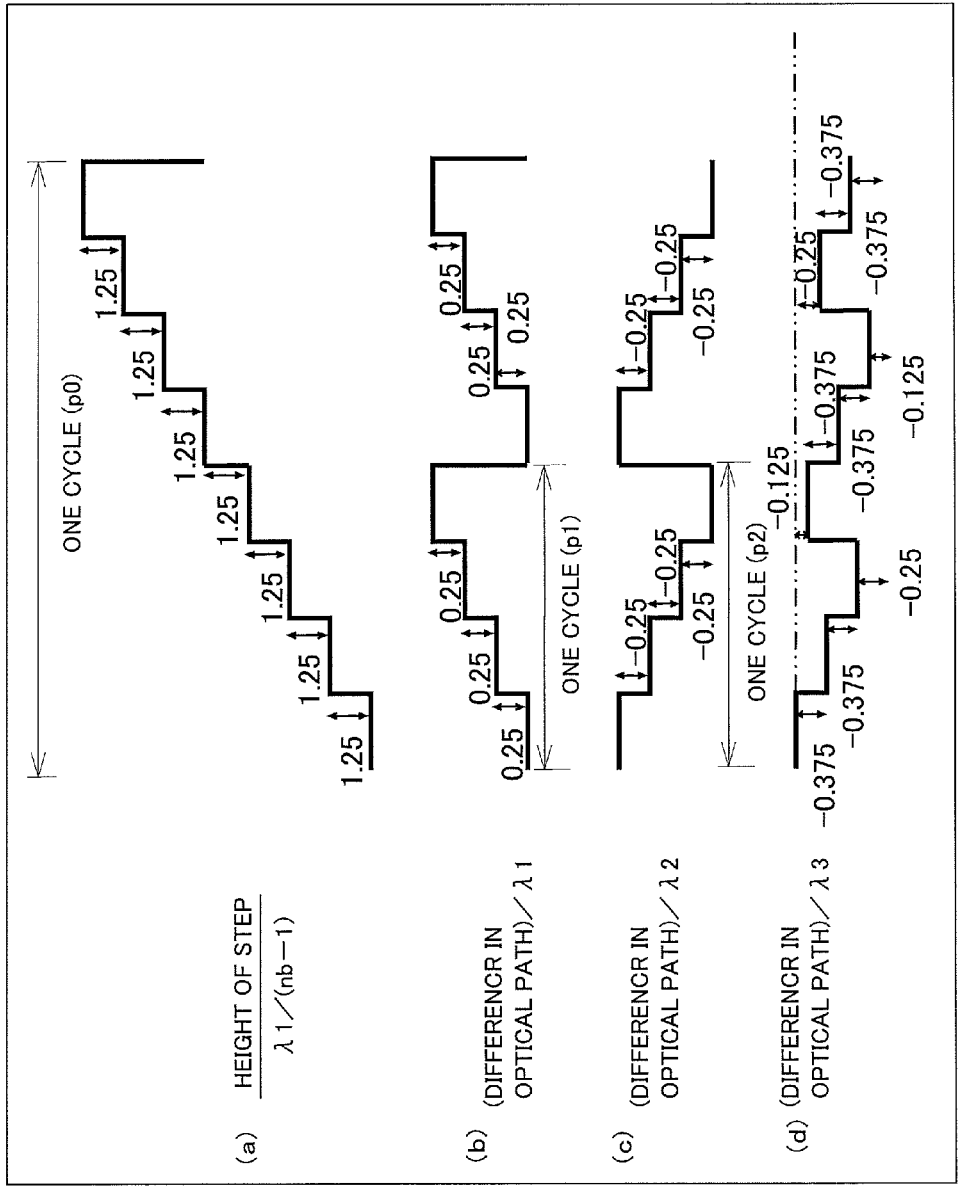
FIG. 9 is a diagram illustrating a stair-like diffraction structure provided on an inner part of the objective lens element shown in FIG. 8.

FIG. 9 is a diagram illustrating the stair-like diffraction structure provided on the inner part of the objective lens element shown in FIG. 8. FIG. 9(a) shows a theoretical shape of the stair-like step structure provided on the optical function surface of the objective lens element. FIG. 9(b) shows an amount of phase change provided to the light beam of the wavelength $\lambda_1$ for BD, FIG. 9(c) shows an amount of phase change provided to the light beam of the wavelength $\lambda_2$ for DVD, and FIG. 9(d) shows an amount of phase change provided to the light beam of the wavelength $\lambda_3$ for CD.

The stair-like diffraction structure shown in FIG. 9(a) is a periodic structure in which one cycle consists of 8-level steps whose height is monotonically increased step by step. The height of one step is set such that a difference in optical path that is about 1.25 times as long as the wavelength $\lambda_1$ is provided to the blue light beam for BD. When the light beam of the wavelength $\lambda_1$ is incident on the stair-like diffraction structure, a phase difference of about 0.25 wavelength is provided to the light beam of the wavelength $\lambda_1$ each time the step height is increased by one step. In other words, the amount of phase change with respect to the light beam of the wavelength $\lambda_1$ is about $\frac{1}{2}\pi$ per step. Since one cycle p1 consists of 8-level steps, the stair-like diffraction structure in FIG. 9(a) can be regarded as two cycles p0 each consisting of 4-level steps, as shown in FIG. 9(b). Thus, when the light beam of the wavelength $\lambda_1$ for BD is used, the diffraction efficiency of a +2nd order diffracted light beam is at its maximum.

When the light beam of the wavelength $\lambda_2$ for DVD is incident, one step provides a difference in optical path of about 0.75 wavelength to the light beam of the wavelength $\lambda_2$. Thus, the stair-like diffraction structure provides a phase difference of about −0.25 wavelength to the light beam of the wavelength $\lambda_2$ each time the step height is increased by one step. In other words, the amount of phase change with respect to the light beam of the wavelength $\lambda_2$ is about $-\frac{1}{2}\pi$ per step. Since one cycle p1 consists of 8-level steps, the stair-like diffraction structure in FIG. 9(a) can be regarded as two cycles p0 each consisting of 4-level steps, as shown in FIG. 9(c). Thus, when the light beam of the wavelength $\lambda_2$ for DVD is used, the diffraction efficiency of a −2nd order diffracted light beam is at its maximum.

When the light beam of the wavelength $\lambda_3$ for CD is incident, one step provides a difference in optical path of about 0.675 wavelength to the light beam of the wavelength $\lambda_3$. Thus, the stair-like diffraction structure provides a phase difference of about −0.375 wavelength to the light beam of the wavelength $\lambda_3$ each time the step height is increased by one step. Since one cycle p1 consists of 8-level steps, the stair-like diffraction structure in FIG. 9(a) functions similarly as a structure in which stair-like steps are provided at three locations, as shown in FIG. 9(d), and the diffraction efficiency of a −3rd order diffracted light beam is at its maximum.

As described above, the stair-like diffraction structure shown in FIG. 9(a) serves as an optical element having positive power with respect to the light beam of the wavelength $\lambda_1$ and serves as an optical element having negative power with respect to the light beams of the wavelengths $\lambda_2$ and $\lambda_3$.

Figure 10:
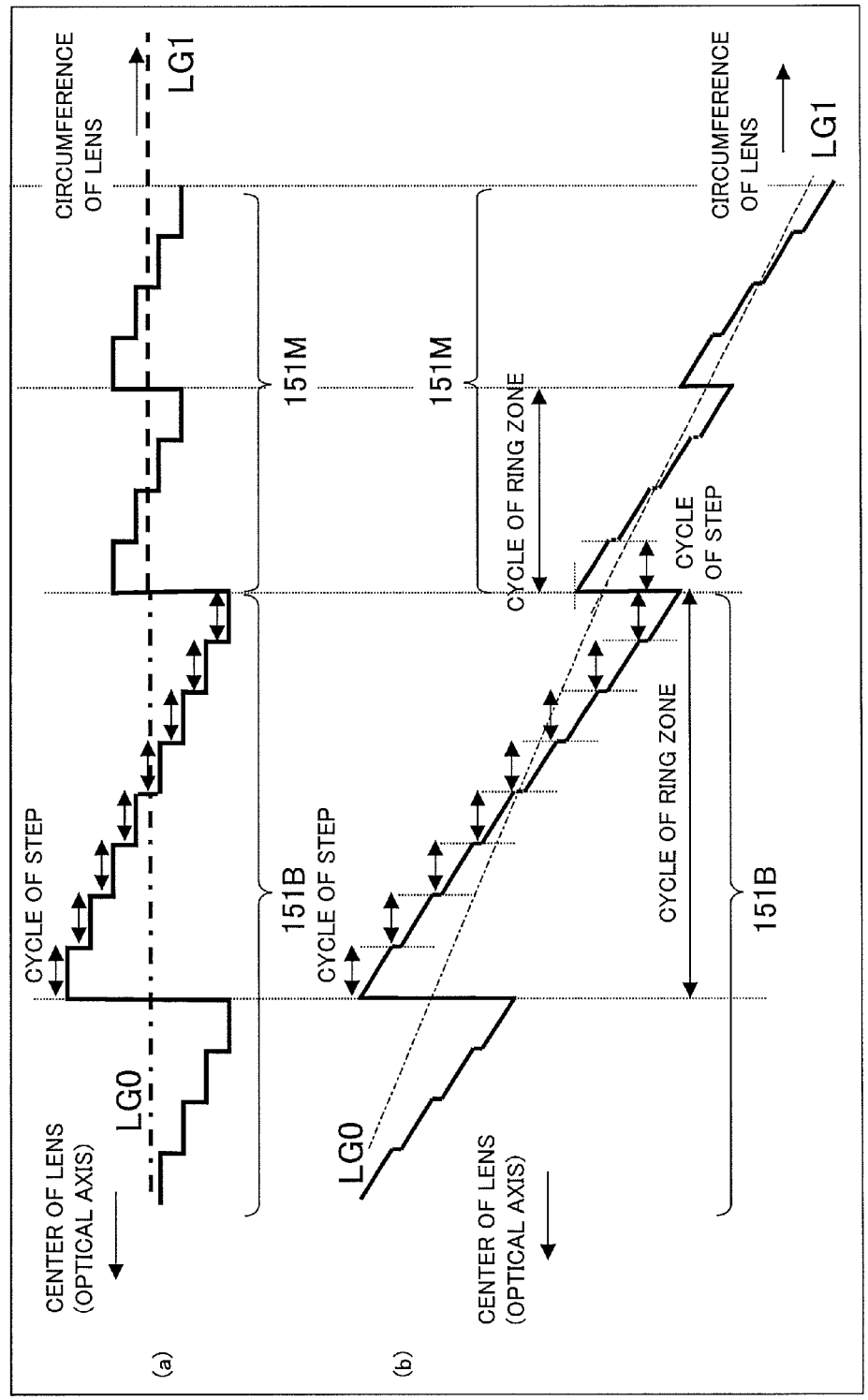
FIG. 10 is a diagram illustrating diffraction structures provided near the boundary between the inner part and an outer part of the objective lens element shown in FIG. 8.

FIG. 10 is a diagram illustrating diffraction structures provided near the boundary between the inner part and the outer part of the objective lens element shown in FIG. 8. FIG. 10(a) is a diagram in which a base aspheric surface is removed and only the diffraction structures are provided on a planar surface for easy understanding. FIG. 10(b) is a diagram in which the diffraction structures are provided on the base aspheric surface of the objective lens element.

In FIG. 10, a curved surface LG0 (indicated by straight lines in FIG. 10) is a curved surface extending at an intermediate level of recesses and projections of the stair-like diffraction structure provided on the inner part 151B, and a curved surface LG1 (indicated by alternate long and short dash lines in FIG. 10) is a curved surface extending at an intermediate level of recesses and projections of the sawtooth-like diffraction structure provided on the intermediate part 151M.

In the present embodiment, in the vicinity of the boundary between the inner part 151B and the intermediate part 151M, the curved surface LG0 and the curved surface LG1 are smoothly connected to each other. By forming the diffraction structures in this manner, even when the wavelength of a light source changes and/or the refractive index of the lens material changes due to a temperature change, a phase shift is prevented from occurring between a light beam passing through the inner part 151B and a light beam passing through the intermediate part 151M. As a result, a decrease in diffraction efficiency that is caused by a phase mismatch can be prevented, and occurrence of an aberration can be suppressed.

Although not shown in FIG. 10, in the vicinity of the boundary between the intermediate part 151M and the outer part 151F, the stair-like step structure provided on the intermediate part 151M and the sawtooth-like diffraction structure provided on the outer part 151F are connected to each other similarly as described above. The manner of the connection is as described above in Embodiment 2, and thus the repeated description is omitted here.

Figure 11:
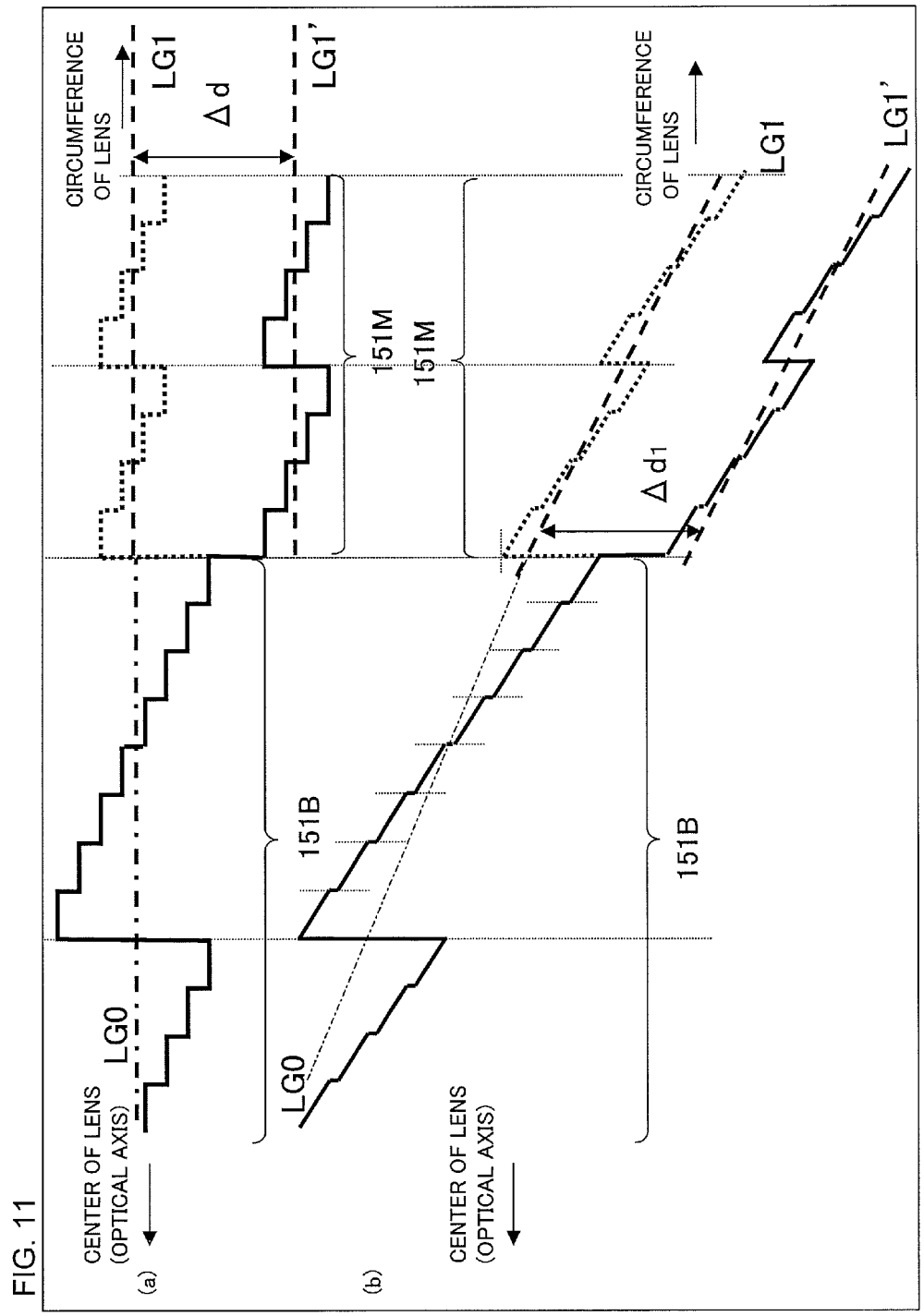
FIG. 11 is a diagram illustrating a modified example of Embodiment 3.

FIG. 11 is a diagram illustrating a modified example of Embodiment 3. FIG. 11(a) is a diagram in which a base aspheric surface is removed and only diffraction structures are provided on a planar surface for easy understanding. FIG. 11(b) is a diagram in which the diffraction structures are provided on the base aspheric surface of the objective lens element.

In FIG. 11, a curved surface LG1' is a curved surface extending at an intermediate level of the recesses and the projections of the stair-like diffraction structure provided on the intermediate part 151M. In the example in FIG. 11, in the vicinity of the boundary between the inner part 151B and the intermediate part 151M, the curved surface LG0 and the curved surface LG1 are connected to each other through a step having a height $\Delta d_1$.

The height $\Delta d_1$ of the step satisfies the following conditions.

$$\Delta d_1 = a \times \lambda_1 / (n_1 - 1) \tag{6}$$

$$\Delta d_1 = b \times \lambda_2 / (n_2 - 1) \tag{7}$$

Here, a is an integer, b is an integer, $n_1$ is the refractive index of a material forming the objective lens element, with respect to the light beam of the wavelength $\lambda_1$, and $n_2$ is the refractive index of the material forming the objective lens element, with respect to the light beam of the wavelength $\lambda_2$.

These conditions mean that the height $\Delta d_1$ of the step where the curved surface LG0 and the curved surface LG1' are connected to each other is an integral multiple of the wavelength $\lambda_1$ of the light beam for BD and an integral multiple of the wavelength $\lambda_2$ of the light beam for DVD. The light beams of the wavelengths $\lambda_1$ and $\lambda_2$ are incident on both the inner part 151B and the intermediate part 151M over the boundary therebetween. Thus, the height $\Delta d_1$ of the step is set such that no phase difference occurs between a light beam having passed through the inner part 151B and a light beam having passed through the intermediate part 151M. Here, when the above two equations are solved for b, the following equation is provided.

$$b = a \times \lambda_1/\lambda_2 \times (n_2 1)/(n_1 - 1)$$

The order of a refractive index change for each wavelength is not so great. Thus, the value of $(n_2-1)/(n_1-1)$ can be regarded as 1, and the equation can be approximated as $b \approx a \times \lambda_1/\lambda_2$. As an actual value of b, an integer closest to $a \times \lambda_1/\lambda_2$ is preferably selected. When $\lambda_1$ is 408 nm and $\lambda_2$ is 458 nm as a specific example, $(a, b)=(5, 3), (10, 6), (15, 9), \ldots$ can be used as combinations of a and b. In other words, it suffices to satisfy that a=5m and b=3m (where m is an integer other than 0).

Further, when the curved surface LG1' extending at the intermediate level of the recesses and the projections of the stair-like diffraction structure provided on the intermediate part 151M and a curved surface (not shown) extending at an intermediate level of recesses and projections of the sawtooth-like diffraction structure provided on the outer part 151F are connected to each other through a step having a height $\Delta d_2$, the height $\Delta d_2$ satisfies the following condition.

$$\Delta d_2 = c \times \lambda_1/(n_1-1) \tag{8}$$

Here,
  c is an integer, and
  $n_1$ is the refractive index of the material forming the objective lens element, with respect to the light beam of the wavelength $\lambda_1$.

When the condition is satisfied, a phase mismatch does not occur between a light beam having passed through the intermediate part 151M and a light beam having passed through the outer part 151F, and a decrease in diffraction efficiency and occurrence of an aberration can be suppressed, as described above in Embodiment 2.

Figure 12:
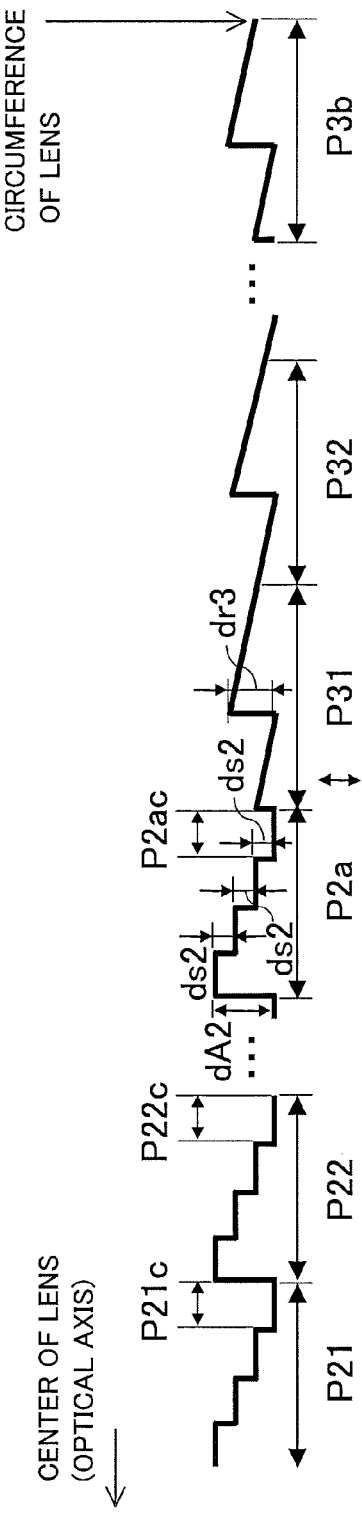
FIG. 12 is a diagram illustrating pitches and depths of the diffraction structures provided in the objective lens element according to Embodiment 3.

FIG. 12 is a diagram illustrating pitches and depths of the diffraction structures provided in the objective lens element according to Embodiment 3.

The objective lens element according to Embodiment 3 preferably simultaneously satisfies the following conditions.

$$3 \times P2ac < P2a < 5 \times P2ac \tag{9}$$

$$0.3 \times P2a/n < P31/m < 1.5 \times P2a/n \tag{10}$$

$$P31 > 2 \times P3b \tag{11}$$

Here,
  P2*ac* is the pitch of the outermost step of the stair-like diffraction structure located at the outermost portion of the intermediate part,
  P2*a* is the pitch of the stair-like diffraction structure located at the outermost portion of the intermediate part,
  P31 is the pitch of the sawtooth-like diffraction structure located at the innermost portion of the outer part,
  P3*b* is the pitch of the sawtooth-like diffraction structure located at the outermost portion of the outer part,
  m is the diffraction order with respect to a light beam of the wavelength $\lambda_1$ incident on the outer part, and
  n is the diffraction order with respect to a light beam of the wavelength $\lambda_1$ incident on the intermediate part.

The conditions (9) and (10) define the relation between the pitch of the outermost stair-like diffraction structure on the intermediate part 151M and the pitch of the innermost sawtooth-like diffraction structure on the outer part 151F. When P31/m is equal to or lower than 0.3 time that of P2*a/n* or equal to or higher than 1.5 times that of P2*a/n* and the condition (2) is not satisfied, the degree of phase change greatly changes between the intermediate part 151M and the outer part 151F. Thus, a great aberration occurs due to a change of the wavelength and/or a temperature change.

Further, the condition (11) defines the relation between the pitches of the outermost and innermost sawtooth-like diffraction structures on the outer part 151F. Since depth of the focal point for BD is shallow, chromatic aberration performance is required, and it is preferred to suppress a high-order aberration. When the condition (11) is not satisfied, the chromatic aberration performance of the outer part 151F, which is the region dedicated for BD, deteriorates.

The objective lens element according to Embodiment 3 preferably satisfies the following condition.

$$dr3/m < ds2 < dA2 < 4 \times ds2 \tag{12}$$

Here,
  dr3 is the depth of the sawtooth-like diffraction structure on the outer part,
  dA2 is the depth of the stair-like diffraction structure on the intermediate part,
  ds2 is the depth of a step of the stair-like diffraction structure on the intermediate part, and
  m is the diffraction order with respect to the light beam of the wavelength $\lambda_1$ incident on the outer part.

The condition (12) defines the relation between the depth of the stair-like diffraction structure on the inner part 151B and the depth of the sawtooth-like diffraction structure on the outer part 151F. When the condition (12) is not satisfied, the diffraction efficiency of the entire objective lens element is decreased when the light beam of the wavelength for BD.

Figure 13:
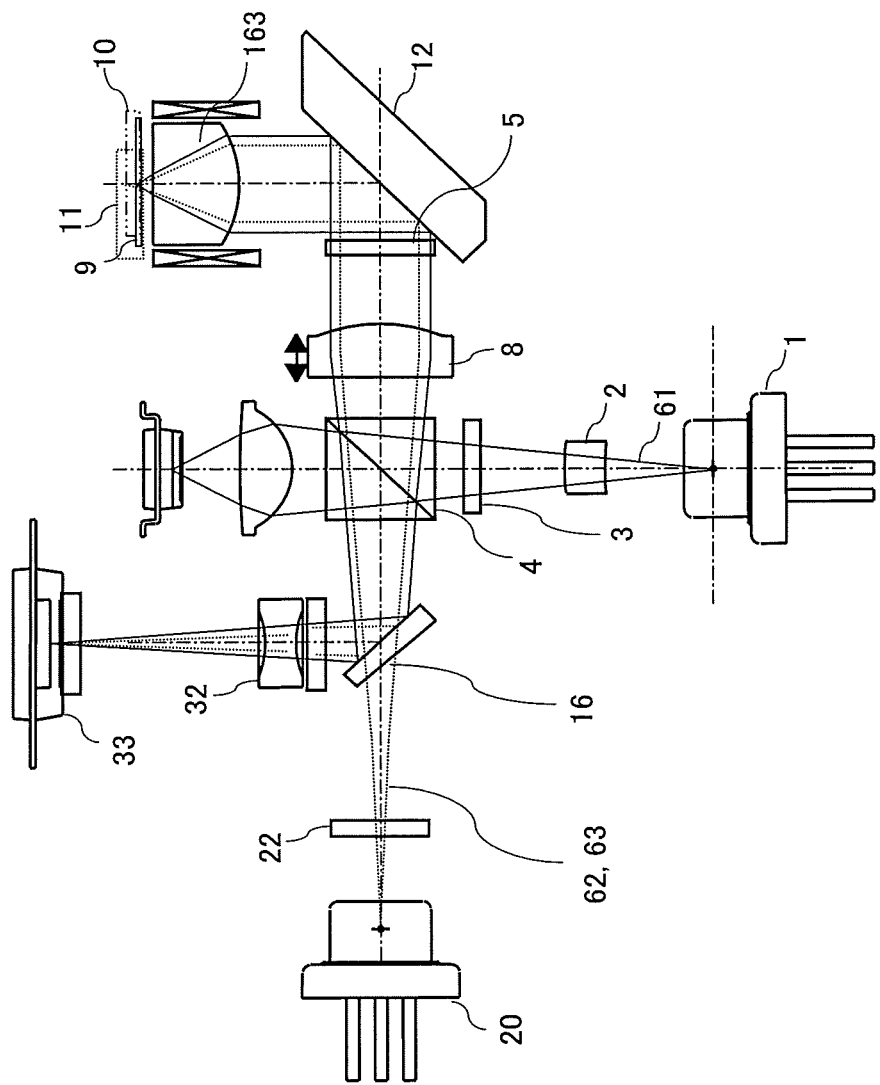
FIG. 13 is a schematic configuration diagram of an optical pickup device including the objective lens element according to Embodiment 3.

FIG. 13 is a schematic configuration diagram of an optical pickup device including the objective lens element according to Embodiment 3.

A blue light beam 61 emitted from a laser beam source 1 passes through a three-beam grating 5 and a relay lens 2, is reflected by a beam splitter 4, and then is converted into a substantially parallel light beam by a collimating lens 8. The collimating lens 8 moves in an optical axis direction. By such movement in the optical axis direction, the collimating lens 8 compensates for a spherical aberration caused by an error of a base material thickness of an optical disc and a difference in base material thickness between information recoding surfaces. The blue light beam 61 having passed through the collimating lens 8 passes through a quarter wavelength plate 5, is reflected by an upward reflection mirror 12, enters the objective lens element 163, and is converged on an information recoding surface of an optical disc 9 to form a desired spot thereon. The blue light beam 61 reflected by the information recoding surface of the optical disc 9 passes through the objective lens element 163 again, is reflected by the upward reflection mirror 12, and passes through the quarter wavelength plate 5, the collimating lens 8, and the beam splitter 4 in order. The blue light beam 61 outputted from the beam splitter 4 is reflected by a beam splitter 16, is converged on a photodetector 33 by a detection lens 32, and is detected as an optical signal.

A laser beam source according to the present embodiment is a two-wavelength laser beam source that selectively emits a red light beam and an infrared light beam. A red light beam 62 emitted from a laser beam source 20 passes through a three-beam grating 22, the beam splitter 16, and the beam splitter 4, enters the collimating lens 8, and is converted into diffused light. The collimating lens 8 can adjust the parallelism of the red light beam 62 by moving in the optical axis direction. In addition, similarly to the case where the optical disc 9 is used, by moving in the optical axis direction, the collimating lens 8 compensates for a spherical aberration caused by a difference in disc base material thickness, a temperature change, a wavelength change, and the like. The red light beam 62 having passed through the collimating lens 8 passes through the quarter wavelength plate 5, is reflected as diverging light by the upward reflection mirror 12, enters the objective lens element 163, and is converged on an information recoding surface of an optical disc 10 to form a desired spot thereon. The red light beam 62 reflected by the information recoding surface of the optical disc 10 passes through the objective lens element 163 again, is reflected by the upward reflection mirror 12, and passes through the quarter wavelength plate 5, the collimating lens 8, and the beam splitter 4 in order. The red light beam 62 outputted from the beam splitter 4 is reflected by the beam splitter 16, is converged on the photodetector 33 by the detection lens 32, and is detected as an optical signal.

An infrared light beam 63 emitted from the laser beam source 20 passes through the three-beam grating 22, the beam splitter 16, and the beam splitter 4, enters the collimating lens 8, and is converted into diffused light. The infrared light beam 63 outputted from the collimating lens 8 passes through the quarter wavelength plate 5, is reflected by the upward reflection mirror 12, enters the objective lens element 163, and is converged on an information recoding surface of an optical disc 11 to form a desired spot thereon. The infrared light beam 63 reflected by the information recoding surface of the optical disc 11 passes through the objective lens element 163 again, is reflected by the upward reflection mirror 12, passes through the quarter wavelength plate 5, the collimating lens 8, and the beam splitter 4 in order, and is reflected by the beam splitter 16. Then, the infrared light beam 63 is converged by the detection lens 32 and detected as an optical signal by the photodetector 33.

Since the optical pickup device shown in FIG. 13 includes the objective lens element 163 according to Embodiment 3, even when the wavelength of the light source changes and/or the refractive index of the material forming the objective lens element 163 changes due to a temperature change, a decrease in diffraction efficiency and occurrence of an aberration are suppressed, and it is possible to form a stable converged light spot.

In Embodiments 1 to 3 described above, the diffraction structures provided on the objective lens element have been described as examples. However, the present invention is similarly applicable to the case where different types of diffraction structures are provided on a surface of a plate or the like not having power of refraction, so as to be adjacent to each other. Specifically, it suffices that a planar optical function surface is divided into a plurality of coaxial regions each having a center at a rotational symmetry axis, the stair-like diffraction structure or the sawtooth-like diffraction structure described above in Embodiments 1 to 3 is provided on each of the adjacent regions, and surfaces respectively extending at intermediate levels of recesses and projections of the diffraction structures provided on the regions are smoothly connected to each other. Alternatively, when the steps respectively extending at the intermediate levels of the diffraction structures provided on the adjacent reigns are connected to each other through a step, it suffices that the height of the step is set to be an integer multiple of a shortest designed wavelength.

EXAMPLES

Hereinafter, Numerical Examples of the present invention will be specifically described with construction data, aberration diagrams, and the like. Note that in each Numerical Example, a surface to which an aspheric coefficient is provided indicates a refractive optical surface having an aspherical shape or a surface (e.g., a diffractive surface) having a refraction function equal to that of an aspheric surface. The surface shape of an aspheric surface is defined by the following formula.

$$X = \frac{C_j h^2}{1 + \sqrt{1 - (1 + k_j) C_j^2 h^2}} + \sum A_{j,n} h^n$$

Here,

X is the distance from an on-the-aspheric-surface point at a height h relative to the optical axis to a tangential plane at the top of the aspheric surface, h is the height relative to the optical axis, $C_j$ is the radius of curvature at the top of an aspheric surface of a lens jth surface ($C_j=1/R_j$), $K_j$ is the conic constant of the lens jth surface, and $A_{j,n}$ is the nth-order aspheric constant of the lens jth surface.

Further, a phase difference caused by a diffraction structure added to an optical surface is provided by the following formula.

$$\phi(h) = \Sigma P_{j,m} h^{2m}$$

Here,

Φ(h) is a phase function, h is the height relative to the optical axis, and $P_{j,m}$ is the 2mth-order phase function coefficient of the lens jth surface.

Numerical Example 1

Numerical Example 1 corresponds to Embodiment 2. A first surface of an objective lens element according to Numerical Example 1 is divided into an inner part including a symmetry axis and an outer part surrounding the inner part. The inner part of the first surface is provided with a stair-like diffraction structure, and the outer part is provided with a sawtooth-like diffraction structure. A second surface of the objective lens element is also divided into an inner part and an outer part on which different aspheric surfaces are provided respectively. The objective lens element according to Numerical Example 1 is a BD/DVD compatible lens. With regard to designed values for BD, the wavelength is 408 nm; the focal length is 2.24 mm; the numerical aperture (NA) is 0.86; and the protective layer thickness of an information storage medium is 0.1 mm. With regard to designed values for DVD, the wavelength is 658 nm; the focal length is 1.74 mm; the NA is 0.6; and the protective layer thickness of an information storage medium is 0.6 mm.

Tables 1 and 2 show construction data of the objective lens element according to Numerical Example 1.

TABLE 1

|  | BD | DVD |
|---|---|---|
| Wavelength | 0.408 | 0.658 |
| Diameter of aperture | 2.24 | 1.74 |
| NA | 0.86 | 0.6 |
| Working distance (WD) | 0.4 | 0.3 |
| Disc thickness (DT) | 0.1 | 0.6 |
| Focal length | 1.3 | 1.4 |

TABLE 1-continued

| | | | |
|---|---|---|---|
| Diffraction order of inner part of the first surface | | 2 | −2 |
| Diffraction order of outer part of the first surface | | 3 | — |
| Object point (OP) | | ∞ | 100 |

| Surface No. | Radius of curvature at the top | Thickness | Material | Remarks column |
|---|---|---|---|---|
| 0 | | OP | | Inner part (diffractive surface) |
| | | | | Outer part (diffractive surface) |
| 1 | 0.8623596 | 1.53761 | n1 | Inner part (aspheric surface) |
| | | | | Outer part (aspheric surface) |
| 2 | −1.4180252 | WD | | |
| 3 | ∞ | DT | disk | Plane |
| 4 | ∞ | | | Plane |

| | | |
|---|---|---|
| Wavelength | 0.408 | 0.658 |
| n1 | 1.52183 | 1.50399 |
| disk | 1.61642 | 1.57829 |

TABLE 2

| First surface | Inner part Diffractive surface |
|---|---|
| | Diffractive surface |
| Region | 0 mm-0.875 mm Aspheric constant |
| RD | 0.8623596 |
| k | −0.60941585 |
| A0 | 0 |
| A2 | 0 |
| A4 | 0.030312057 |
| A6 | 0.007903167 |
| A8 | 0.033434594 |
| A10 | −0.040242123 |
| A12 | 0.03565307 |
| A14 | 0 |
| A16 | 0 |

| First surface | Inner part Phase function |
|---|---|
| | Diffractive surface |
| P2 | −252.69918 |
| P4 | 19.488719 |
| P6 | −6.0774978 |

| First surface | Outer part Diffractive surface |
|---|---|
| | Diffractive surface |
| Region | 0.875 mm-1.135 mm Aspheric constant |
| RD | 0.88626293 |
| k | −0.56324572 |
| A0 | −0.000783721 |
| A2 | 0 |
| A4 | 0.02841522 |
| A6 | 0.024092703 |
| A8 | 0.014300394 |
| A10 | 0.005422059 |
| A12 | −0.001226095 |
| A14 | −0.006152124 |
| A16 | −0.010042872 |

TABLE 2-continued

| First surface | Outer part Phase function |
|---|---|
| | Diffractive surface |
| P2 | −94.238879 |
| P4 | −4.7829869 |
| P6 | −5.4908529 |

| Second surface | Inner part Diffractive surface |
|---|---|
| Region | 0 mm-0.53 mm Aspheric constant |
| RD | −1.4180252 |
| k | −23.75474 |
| A0 | 0 |
| A2 | 0 |
| A4 | 0.35949876 |
| A6 | −0.28463298 |
| A8 | −3.2713988 |
| A10 | 19.065115 |
| A12 | −33.47043 |

| Second surface | Outer part Diffractive surface |
|---|---|
| Region | 0.53 mm-0.88 mm Aspheric constant |
| RD | −2.718803 |
| k | −100.84377 |
| A0 | −0.014784807 |
| A2 | 0 |
| A4 | 0.020787673 |
| A6 | −0.032165463 |
| A8 | −0.072879952 |
| A10 | −0.019240323 |
| A12 | 0.10525242 |
| A14 | 0.13019095 |
| A16 | −0.17951674 |

Figure 14:
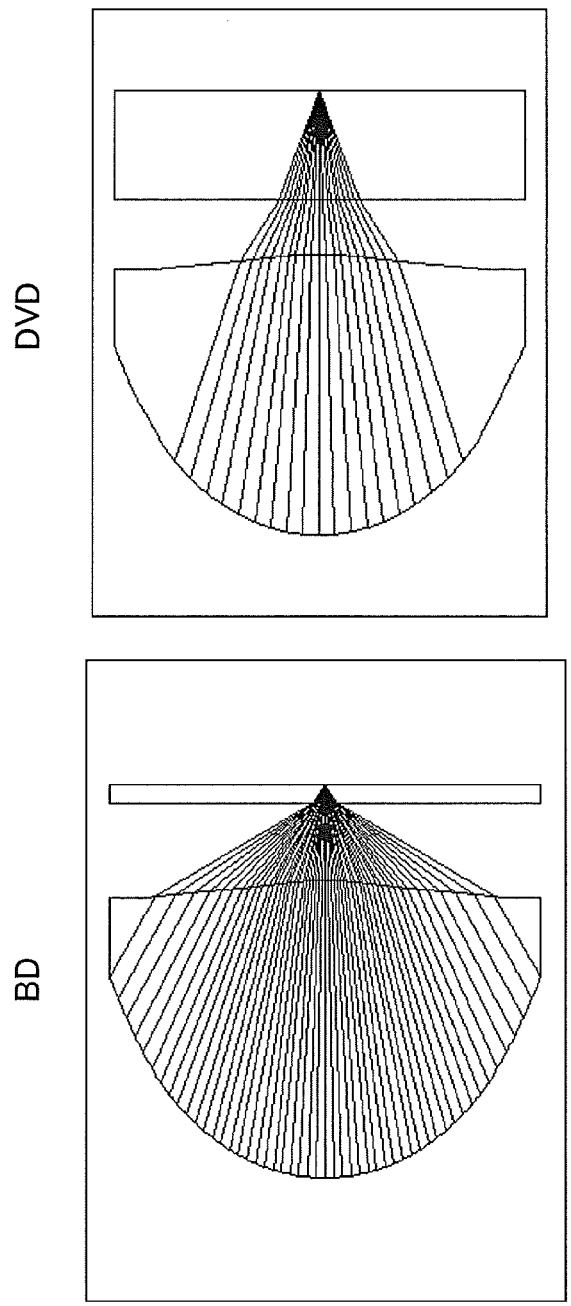
FIG. 14 is an optical path diagram of an objective lens element according to Numerical Example 1.
Figure 15:
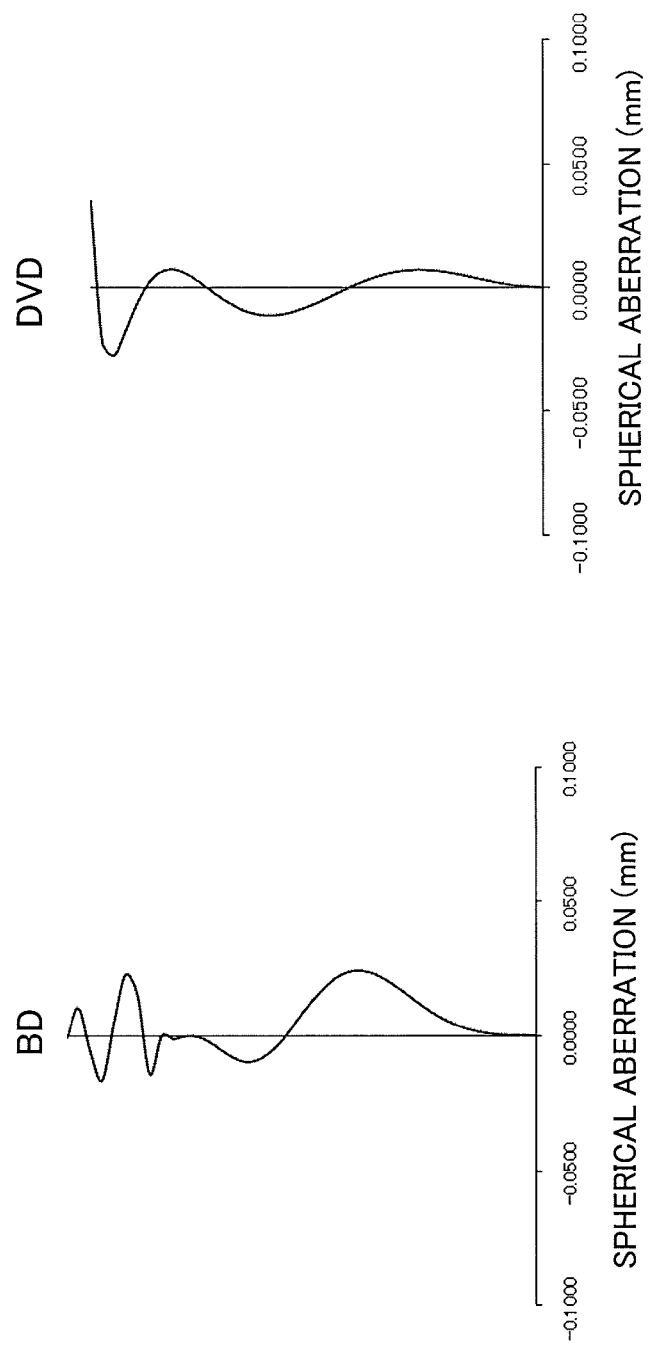
FIG. 15 is graphs each showing a spherical aberration when a parallel light beam is incident on the objective lens element according to Numerical Example 1.
Figure 16:
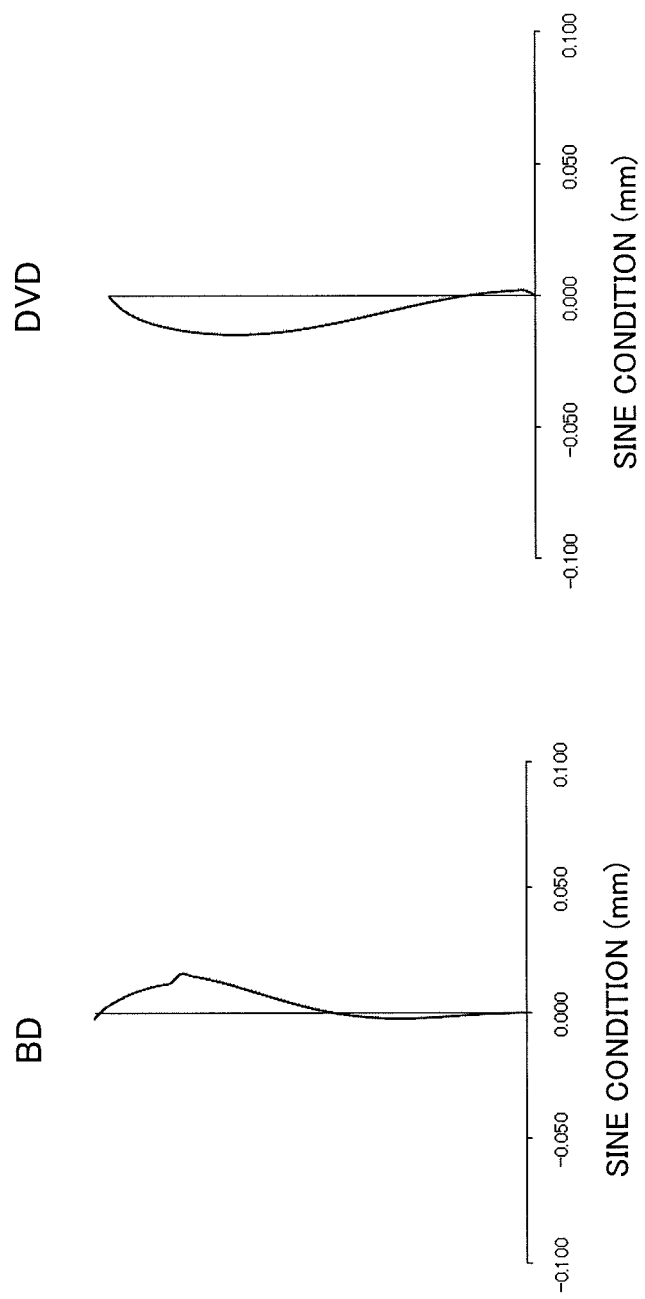
FIG. 16 is graphs each showing a sine condition when a parallel light beam is incident on the objective lens element according to Numerical Example 1.

FIG. 14 is an optical path diagram of the objective lens element according to Numerical Example 1. FIG. 15 is graphs each showing a spherical aberration when a parallel light beam is incident on the objective lens element according to Numerical Example 1. FIG. 16 is graphs each showing a sine condition when a parallel light beam is incident on the objective lens element according to Numerical Example 1. From FIGS. 15 and 16, it is recognized that aberrations are favorably compensated.

Table 3 shows ring zone cycles of the stair-like step structure provided on the inner part of the first surface, and cycles of steps arranged in each ring zone.

TABLE 3

| | Cycle (mm) |
|---|---|
| First ring zone | 0.158 |
| Second ring zone | 0.065 |
| Third ring zone | 0.050 |
| Fourth ring zone | 0.043 |
| Fifth ring zone | 0.038 |
| Sixth ring zone | 0.034 |
| Seventh ring zone | 0.031 |
| Eighth ring zone | 0.029 |
| Ninth ring zone | 0.028 |
| Tenth ring zone | 0.026 |
| Eleventh ring zone | 0.025 |
| Twelfth ring zone | 0.024 |
| Thirteenth ring zone | 0.023 |
| Fourteenth ring zone | 0.022 |
| Fifteenth ring zone | 0.021 |

TABLE 3-continued

| | Cycle (mm) | |
|---|---|---|
| Sixteenth ring zone | | 0.021 |
| Seventeenth ring zone | | 0.020 |
| Eighteenth ring zone | | 0.020 |
| Nineteenth ring zone | | 0.019 |
| Twentieth ring zone | | 0.019 |
| Twenty-first ring zone | | 0.018 |
| Twenty-second ring zone | | 0.018 |
| Twenty-third ring zone | | 0.017 |
| Twenty-fourth ring zone | | 0.017 |
| Twenty-fifth ring zone | | 0.017 |
| Twenty-sixth ring zone | | 0.016 |
| Twenty-seventh ring zone | | 0.016 |
| Twenty-eighth ring zone | | 0.015 |
| Twenty-ninth ring zone | | 0.015 |
| First ring zone | First step | 0.079 |
| | Second step | 0.033 |
| | Third step | 0.025 |
| | Fourth step | 0.021 |
| Second ring zone | First step | 0.019 |
| | Second step | 0.017 |
| | Third step | 0.016 |
| | Fourth step | 0.014 |
| Third ring zone | First step | 0.014 |
| | Second step | 0.013 |
| | Third step | 0.012 |
| | Fourth step | 0.012 |
| Fourth ring zone | First step | 0.011 |
| | Second step | 0.011 |
| | Third step | 0.010 |
| | Fourth step | 0.010 |
| Fifth ring zone | First step | 0.010 |
| | Second step | 0.010 |
| | Third step | 0.009 |
| | Fourth step | 0.009 |
| Sixth ring zone | First step | 0.009 |
| | Second step | 0.009 |
| | Third step | 0.008 |
| | Fourth step | 0.008 |
| Seventh ring zone | First step | 0.008 |
| | Second step | 0.008 |
| | Third step | 0.008 |
| | Fourth step | 0.008 |
| Eighth ring zone | First step | 0.008 |
| | Second step | 0.007 |
| | Third step | 0.007 |
| | Fourth step | 0.007 |
| Ninth ring zone | First step | 0.007 |
| | Second step | 0.007 |
| | Third step | 0.007 |
| | Fourth step | 0.007 |
| Tenth ring zone | First step | 0.007 |
| | Second step | 0.007 |
| | Third step | 0.007 |
| | Fourth step | 0.006 |
| Eleventh ring zone | First step | 0.006 |
| | Second step | 0.006 |
| | Third step | 0.006 |
| | Fourth step | 0.006 |
| Twelfth ring zone | First step | 0.006 |
| | Second step | 0.006 |
| | Third step | 0.006 |
| | Fourth step | 0.006 |
| Thirteenth ring zone | First step | 0.006 |
| | Second step | 0.006 |
| | Third step | 0.006 |
| | Fourth step | 0.006 |
| Fourteenth ring zone | First step | 0.006 |
| | Second step | 0.006 |
| | Third step | 0.006 |
| | Fourth step | 0.005 |
| Fifteenth ring zone | First step | 0.005 |
| | Second step | 0.005 |
| | Third step | 0.005 |
| | Fourth step | 0.005 |
| Sixteenth ring zone | First step | 0.005 |
| | Second step | 0.005 |
| | Third step | 0.005 |
| | Fourth step | 0.005 |
| Seventeenth ring zone | First step | 0.005 |
| | Second step | 0.005 |
| | Third step | 0.005 |
| | Fourth step | 0.005 |
| Eighteenth ring zone | First step | 0.005 |
| | Second step | 0.005 |
| | Third step | 0.005 |
| | Fourth step | 0.005 |
| Nineteenth ring zone | First step | 0.005 |
| | Second step | 0.005 |
| | Third step | 0.005 |
| | Fourth step | 0.005 |
| Twentieth ring zone | First step | 0.005 |
| | Second step | 0.005 |
| | Third step | 0.005 |
| | Fourth step | 0.005 |
| Twenty-first ring zone | First step | 0.005 |
| | Second step | 0.005 |
| | Third step | 0.005 |
| | Fourth step | 0.005 |
| Twenty-second ring zone | First step | 0.004 |
| | Second step | 0.004 |
| | Third step | 0.004 |
| | Fourth step | 0.004 |
| Twenty-third ring zone | First step | 0.004 |
| | Second step | 0.004 |
| | Third step | 0.004 |
| | Fourth step | 0.004 |
| Twenty-fourth ring zone | First step | 0.004 |
| | Second step | 0.004 |
| | Third step | 0.004 |
| | Fourth step | 0.004 |
| Twenty-fifth ring zone | First step | 0.004 |
| | Second step | 0.004 |
| | Third step | 0.004 |
| | Fourth step | 0.004 |
| Twenty-sixth ring zone | First step | 0.004 |
| | Second step | 0.004 |
| | Third step | 0.004 |
| | Fourth step | 0.004 |
| Twenty-seventh ring zone | First step | 0.004 |
| | Second step | 0.004 |
| | Third step | 0.004 |
| | Fourth step | 0.004 |
| Twenty-eighth ring zone | First step | 0.004 |
| | Second step | 0.004 |
| | Third step | 0.004 |
| | Fourth step | 0.004 |
| Twenty-ninth ring zone | First step | 0.004 |
| | Second step | 0.004 |
| | Third step | 0.004 |
| | Fourth step | 0.004 |

On the inner part of the Numerical Example 1, one ring zone cycle consists of consecutive 4-level steps. Each ring zone cycle in Table 3 indicates the width of a ring zone in a radial direction (in a direction perpendicular to the optical axis) as indicated by an arrow in FIG. 4(b). On the inner part, a first ring zone, a second ring zone, a third ring zone, . . . , and a twenty-ninth ring zone are provided in order from the optical axis toward the outer circumference of the objective lens element. Further, each step cycle indicates the width, in the radial direction (in the direction perpendicular to the optical axis), of a step provided in each ring zone, as indicated by an arrow in FIG. 4(b). In each ring zone, the steps are referred to as a first step, a second step, a third step, and a fourth step in order from the optical axis side toward the outer circumference.

Table 4 shows ring zone cycles of the sawtooth-like diffraction structure provided on the outer part of the first surface.

TABLE 4

| | Cycle (mm) |
|---|---|
| First ring zone | 0.043 |
| Second ring zone | 0.029 |
| Third ring zone | 0.028 |
| Fourth ring zone | 0.026 |
| Fifth ring zone | 0.025 |
| Sixth ring zone | 0.024 |
| Seventh ring zone | 0.023 |
| Eighth ring zone | 0.022 |
| Ninth ring zone | 0.021 |

Each ring zone cycle in Table 4 indicates the width of a ring zone in the radial direction (in the direction perpendicular to the optical axis) as indicated by an arrow in FIG. 4(b). Specifically, each ring zone cycle indicates the distance between points (adjacent points) where the contour line of a lens effective surface (except wall surfaces of steps that are parallel to the optical axis) intersects an alternate long and short dashed line representing a curved surface MG2 in the cross-section shown in FIG. 4(b). On the outer part, a first ring zone, a second ring zone, a third ring zone, a fourth ring zone, . . . , and a ninth ring zone are provided in order from the optical axis toward the outer circumference of the objective lens element.

Table 5 shows step heights of the stair-like diffraction structure provided on the inner part of the first surface. In one cycle of the stair-like diffraction structure, the height of each of the first to third steps is set such that a phase difference of 1.25 wavelengths is provided to a light beam of a designed wavelength for BD, and the height of the fourth step is set such that a phase difference of 3.75 wavelengths is provided in the opposite direction.

TABLE 5

| | | Depth (μm) |
|---|---|---|
| First ring zone | First step | 0.98 |
| | Second step | 0.98 |
| | Third step | 0.98 |
| | Fourth step | 2.95 |
| Second ring zone | First step | 0.99 |
| | Second step | 0.99 |
| | Third step | 0.99 |
| | Fourth step | 2.97 |
| Third ring zone | First step | 0.99 |
| | Second step | 0.99 |
| | Third step | 1.00 |
| | Fourth step | 2.99 |
| Fourth ring zone | First step | 1.00 |
| | Second step | 1.00 |
| | Third step | 1.00 |
| | Fourth step | 3.01 |
| Fifth ring zone | First step | 1.01 |
| | Second step | 1.01 |
| | Third step | 1.01 |
| | Fourth step | 3.03 |
| Sixth ring zone | First step | 1.01 |
| | Second step | 1.01 |
| | Third step | 1.02 |
| | Fourth step | 3.05 |
| Seventh ring zone | First step | 1.02 |
| | Second step | 1.02 |
| | Third step | 1.02 |
| | Fourth step | 3.08 |
| Eighth ring zone | First step | 1.03 |
| | Second step | 1.03 |
| | Third step | 1.03 |
| | Fourth step | 3.10 |
| Ninth ring zone | First step | 1.04 |
| | Second step | 1.04 |
| | Third step | 1.04 |
| | Fourth step | 3.12 |
| Tenth ring zone | First step | 1.04 |
| | Second step | 1.05 |
| | Third step | 1.05 |
| | Fourth step | 3.15 |
| Eleventh ring zone | First step | 1.05 |
| | Second step | 1.05 |
| | Third step | 1.06 |
| | Fourth step | 3.18 |
| Twelfth ring zone | First step | 1.06 |
| | Second step | 1.06 |
| | Third step | 1.07 |
| | Fourth step | 3.20 |
| Thirteenth ring zone | First step | 1.07 |
| | Second step | 1.07 |
| | Third step | 1.07 |
| | Fourth step | 3.23 |
| Fourteenth ring zone | First step | 1.08 |
| | Second step | 1.08 |
| | Third step | 1.08 |
| | Fourth step | 3.26 |
| Fifteenth ring zone | First step | 1.09 |
| | Second step | 1.09 |
| | Third step | 1.09 |
| | Fourth step | 3.29 |
| Sixteenth ring zone | First step | 1.10 |
| | Second step | 1.10 |
| | Third step | 1.10 |
| | Fourth step | 3.32 |
| Seventeenth ring zone | First step | 1.11 |
| | Second step | 1.11 |
| | Third step | 1.11 |
| | Fourth step | 3.35 |
| Eighteenth ring zone | First step | 1.12 |
| | Second step | 1.12 |
| | Third step | 1.13 |
| | Fourth step | 3.39 |
| Nineteenth ring zone | First step | 1.13 |
| | Second step | 1.13 |
| | Third step | 1.14 |
| | Fourth step | 3.42 |
| Twentieth ring zone | First step | 1.14 |
| | Second step | 1.15 |
| | Third step | 1.15 |
| | Fourth step | 3.46 |
| Twenty-first ring zone | First step | 1.16 |
| | Second step | 1.16 |
| | Third step | 1.16 |
| | Fourth step | 3.49 |
| Twenty-second ring zone | First step | 1.17 |
| | Second step | 1.17 |
| | Third step | 1.17 |
| | Fourth step | 3.53 |
| Twenty-third ring zone | First step | 1.18 |
| | Second step | 1.18 |
| | Third step | 1.19 |
| | Fourth step | 3.58 |
| Twenty-fourth ring zone | First step | 1.20 |
| | Second step | 1.20 |
| | Third step | 1.20 |
| | Fourth step | 3.62 |
| Twenty-fifth ring zone | First step | 1.21 |
| | Second step | 1.21 |
| | Third step | 1.22 |
| | Fourth step | 3.67 |
| Twenty-sixth ring zone | First step | 1.23 |
| | Second step | 1.23 |
| | Third step | 1.23 |
| | Fourth step | 3.71 |
| Twenty-seventh ring zone | First step | 1.24 |
| | Second step | 1.25 |
| | Third step | 1.25 |
| | Fourth step | 3.77 |
| Twenty-eighth ring zone | First step | 1.26 |
| | Second step | 1.26 |
| | Third step | 1.27 |
| | Fourth step | 3.82 |

TABLE 5-continued

| | Depth (μm) | |
|---|---|---|
| Twenty-ninth ring zone | First step | 1.28 |
| | Second step | 1.28 |
| | Third step | 1.29 |

Table 6 shows step heights of the sawtooth-like diffraction structure provided on the outer part of the first surface. The step heights of the sawtooth-like diffraction structure are set such that a phase difference of 3 wavelengths is provided to the light beam of the designed wavelength for BD, and a +3rd order diffracted light beam is used.

TABLE 6

| | Depth (μm) | |
|---|---|---|
| First ring zone | First step | 3.27 |
| Second ring zone | Second step | 3.66 |
| Third ring zone | Third step | 3.44 |
| Fourth ring zone | Fourth step | 3.51 |
| Fifth ring zone | Fifth step | 3.56 |
| Sixth ring zone | Sixth step | 3.58 |
| Seventh ring zone | Seventh step | 3.57 |
| Eighth ring zone | Eighth step | 3.53 |
| Ninth ring zone | Ninth step | 3.44 |

Numerical Example 2

Numerical Example 2 corresponds to Embodiment 3. A first surface of an objective lens element according to Numerical Example 2 is divided into an inner part including a symmetry axis, an intermediate part surrounding the inner part, and an outer part surrounding the intermediate part. The inner part of the first surface is provided with a stair-like diffraction structure. The intermediate part is provided with a stair-like diffraction structure different from that on the inner part. The outer part is provided with a sawtooth-like diffraction structure. A second surface of the objective lens element consists of an aspheric surface. The objective lens element according to Numerical Example 2 is a BD/DVD/CD compatible lens. With regard to designed values for BD, the wavelength is 408 nm; the focal length is 1.8 mm; the numerical aperture (NA) is 0.86; and the protective layer thickness of an information storage medium is 87.5 μm. With regard to designed values for DVD, the wavelength is 658 nm; the focal length is 2.0 mm; the NA is 0.6; and the protective layer thickness of an information storage medium is 0.6 mm. With regard to designed values for CD, the wavelength is 785 nm; the focal length is 2.1 mm; the NA is 0.47; and the protective layer thickness of an information storage medium is 1.2 mm.

Tables 7 and 8 show construction data of the objective lens element according to Numerical Example 2.

TABLE 7

| | BD | DVD | CD |
|---|---|---|---|
| Wavelength | 0.408 | 0.658 | 0.785 |
| Diameter of aperture | 3.08 | 2.37 | 2.05 |
| NA | 0.86 | 0.6 | 0.47 |
| Working distance (WD) | 0.53 | 0.43 | 0.3 |
| Disc thickness (DT) | 0.0875 | 0.6 | 1.2 |
| Focal length | 1.8 | 2.0 | 2.1 |
| Diffraction order of inner part of the first surface | 2 | −2 | −3 |
| Diffraction order of intermediate part of the first surface | 1 | −1 | — |
| Diffraction order of outer part of the first surface | 3 | — | — |
| Object point (OP) | ∞ | −76 | 100 |

| Surface No. | Radius of curvature at the top | Thickness | Material | Remarks column |
|---|---|---|---|---|
| 0 | | OP | | Inner part (diffractive surface) |
| | | | | Intermediate part (diffractive surface) |
| | | | | Outer part (diffractive surface) |
| 1 | 1.1717432 | 2.185991 | n1 | Aspheric surface |
| 2 | −1.983364 | WD | | |
| 3 | ∞ | DT | disk | Plane |
| 4 | ∞ | | | Plane |

| Wavelength | 0.408 | 0.658 | 0.785 |
|---|---|---|---|
| n1 | 1.52173 | 1.50389 | 1.50072 |
| disk | 1.61642 | 1.57829 | 1.57203 |

TABLE 8

| First surface | Inner part Diffractive surface |
|---|---|
| | Diffractive surface |
| Region | 0 mm-1.02 mm |
| | Aspheric constant |
| RD | 1.1717432 |
| k | −0.65219099 |
| A0 | 0 |
| A2 | 0 |
| A4 | 0.015687974 |
| A6 | 0.005203019 |
| A8 | −0.00798319 |
| A10 | 0.018829131 |
| A12 | −0.018113328 |
| A14 | 0.009073206 |
| A16 | −0.001775416 |

| First surface | Inner part Phase function |
|---|---|
| | Diffractive surface |
| P2 | −95.056152 |
| P4 | 0.53673157 |
| P6 | 0.23124439 |

| First surface | Intermediate part Diffractive surface |
|---|---|
| | Diffractive surface |
| Region | 1.02 mm-1.19 mm |
| | Aspheric constant |
| RD | 1.1717432 |
| k | −0.65219099 |
| A0 | 0 |
| A2 | 0 |
| A4 | 0.015687974 |
| A6 | 0.005203019 |
| A8 | −0.00798319 |
| A10 | 0.018829131 |
| A12 | −0.018113328 |
| A14 | 0.009073206 |
| A16 | −0.001775416 |

TABLE 8-continued

| First surface | Intermediate part Phase function |
|---|---|
| | Diffractive surface |
| P2 | −190.1123 |
| P4 | 1.0734631 |
| P6 | 0.46248878 |

| First surface | Outer part Diffractive surface |
|---|---|
| | Diffractive surface |
| Region | 1.19 mm-1.54 mm |
| | Aspheric constant |
| RD | 1.1476107 |
| k | −0.66945601 |
| A0 | 0.012399303 |
| A2 | 0 |
| A4 | −0.001400947 |
| A6 | 0.013945514 |
| A8 | −0.002083758 |
| A10 | −0.002079095 |
| A12 | 0.000646384 |
| A14 | 0.000174618 |
| A16 | −5.43E−05 |
| A18 | 2.15E−05 |
| A20 | −3.89E−06 |
| A22 | −3.86E−06 |

| First surface | Inner part Phase function |
|---|---|
| | Diffractive surface |
| P2 | −23.390365 |
| P4 | −67.55212 |
| P6 | −37.236633 |

| Second surface | Aspheric surface |
|---|---|
| | Aspheric constant |
| RD | −1.983364 |
| k | −32.2964 |
| A0 | 0 |
| A2 | 0 |
| A4 | 0.12127011 |
| A6 | −0.060296646 |
| A8 | −0.033153877 |
| A10 | 0.011883167 |
| A12 | 0.016785831 |
| A14 | 0.005090454 |
| A16 | −0.00419985 |
| A18 | −0.005928667 |
| A20 | −0.00200897 |
| A22 | 0.00313813 |

Figure 17:
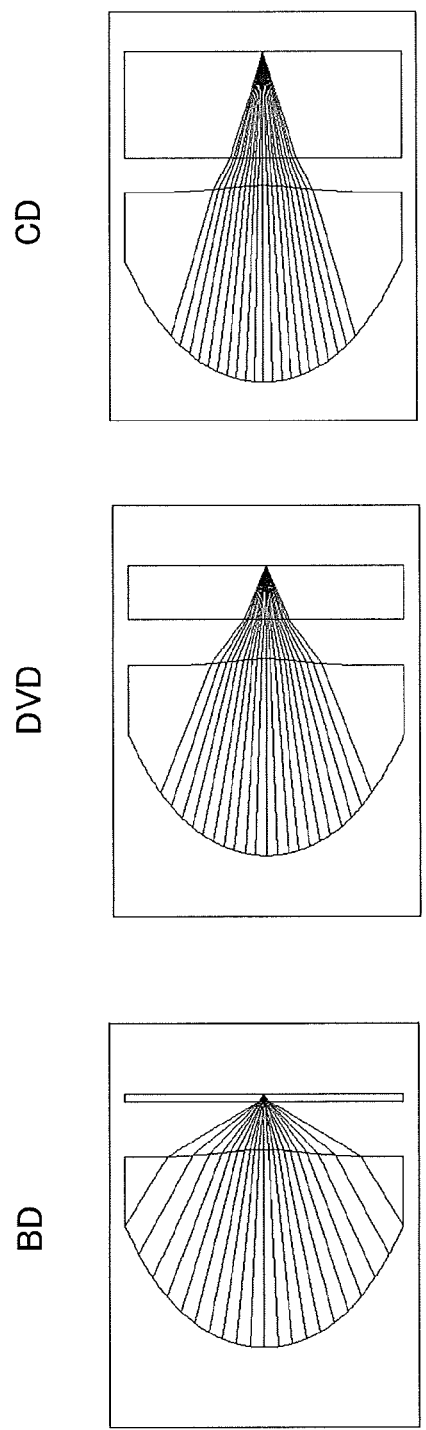
FIG. 17 is an optical path diagram of an objective lens element according to Numerical Example 2.
Figure 18:
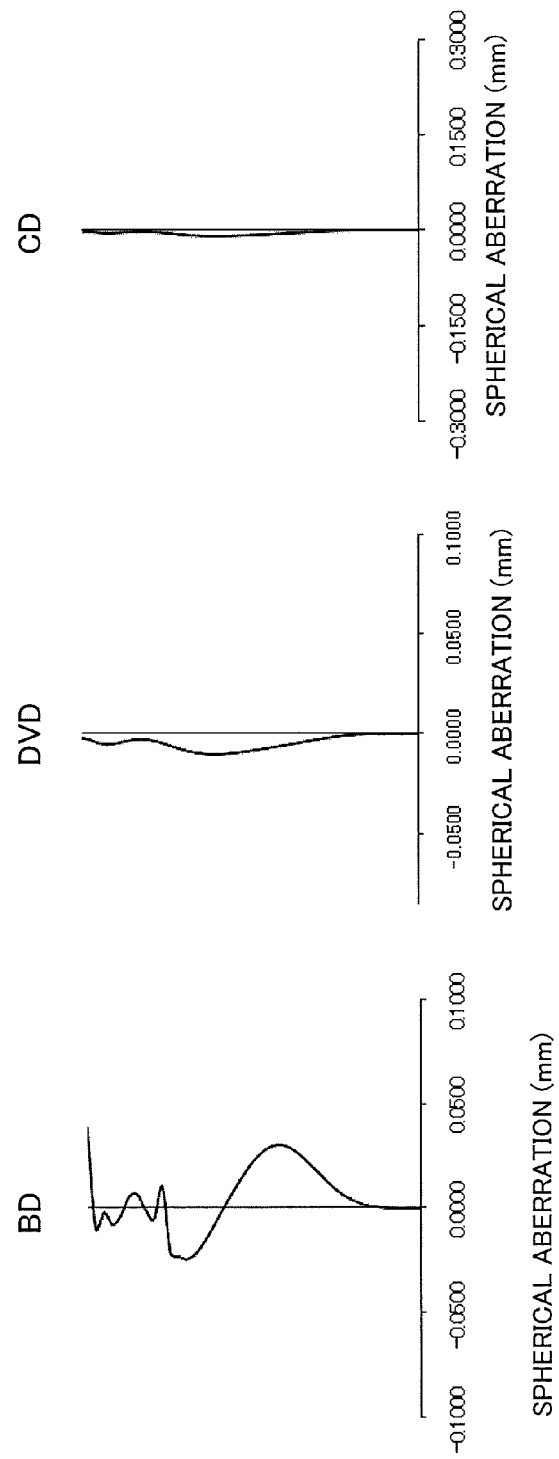
FIG. 18 is graphs each showing a spherical aberration when a parallel light beam is incident on the objective lens element according to Numerical Example 2.
Figure 19:
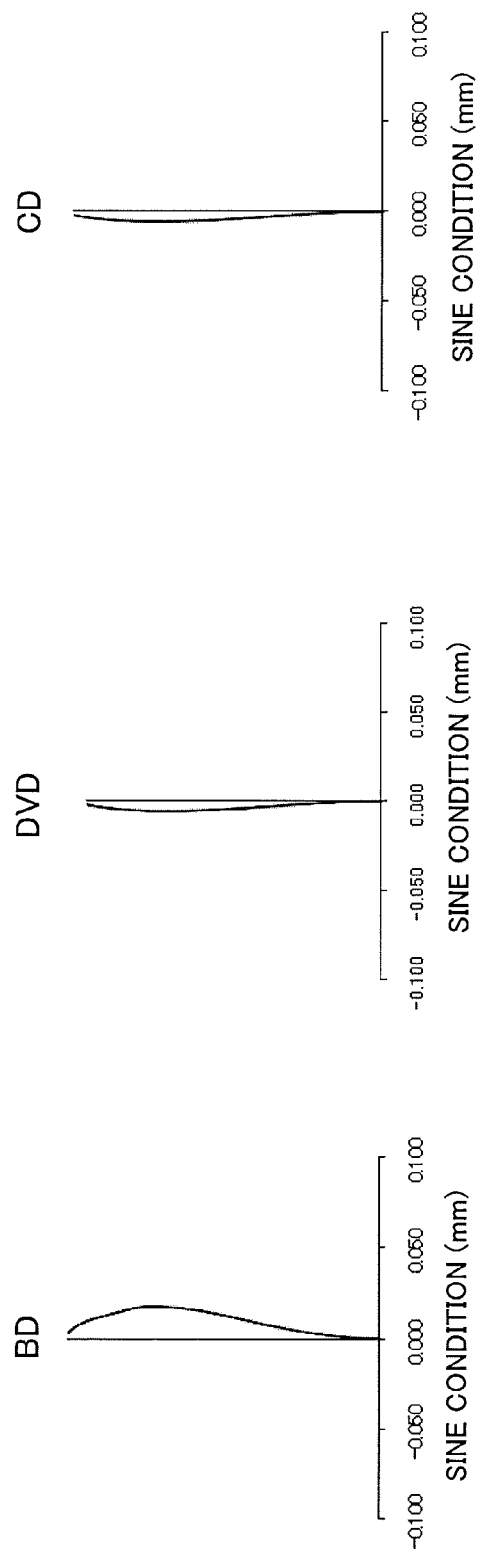
FIG. 19 is graphs each showing a sine condition when a parallel light beam is incident on the objective lens element according to Numerical Example 2.
Figure 20:
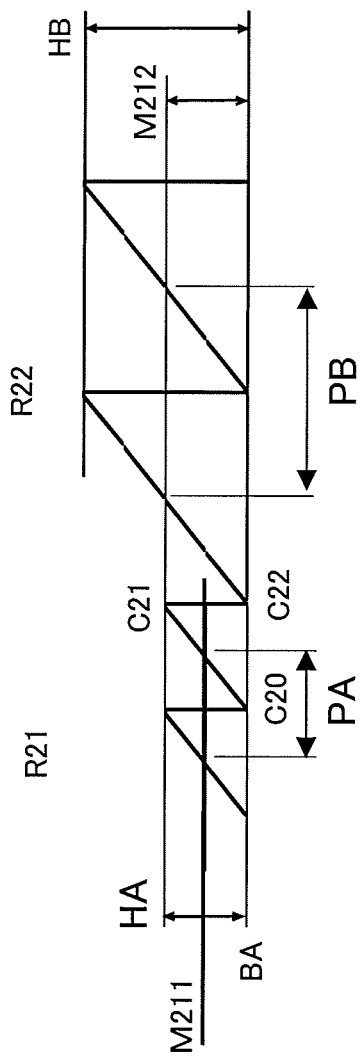
FIG. 20 is a cross-sectional view of a principal part of conventional sawtooth-like diffraction structures.

FIG. 17 is an optical path diagram of the objective lens element according to Numerical Example 2. FIG. 18 is graphs each showing a spherical aberration when a parallel light beam is incident on the objective lens element according to Numerical Example 2. FIG. 19 is graphs each showing a sine condition when a parallel light beam is incident on the objective lens element according to Numerical Example 2. From FIGS. 18 and 19, it is recognized that aberrations are favorably compensated.

Table 9 shows ring zone cycles of the stair-like step structure provided on the inner part of the first surface, and cycles of steps arranged in each ring zone.

TABLE 9

| | | Cycle (mm) |
|---|---|---|
| First ring zone | | 0.257 |
| Second ring zone | | 0.107 |
| Third ring zone | | 0.081 |
| Fourth ring zone | | 0.069 |
| Fifth ring zone | | 0.061 |
| Sixth ring zone | | 0.055 |
| Seventh ring zone | | 0.051 |
| Eighth ring zone | | 0.047 |
| Ninth ring zone | | 0.044 |
| Tenth ring zone | | 0.042 |
| Eleventh ring zone | | 0.040 |
| Twelfth ring zone | | 0.038 |
| Thirteenth ring zone | | 0.037 |
| Fourteenth ring zone | | 0.035 |
| Fifteenth ring zone | | 0.034 |
| Sixteenth ring zone | | 0.033 |
| First ring zone | First step | 0.091 |
| | Second step | 0.038 |
| | Third step | 0.029 |
| | Fourth step | 0.024 |
| | Fifth step | 0.021 |
| | Sixth step | 0.019 |
| | Seventh step | 0.018 |
| | Eighth step | 0.017 |
| Second ring zone | First step | 0.016 |
| | Second step | 0.015 |
| | Third step | 0.014 |
| | Fourth step | 0.013 |
| | Fifth step | 0.013 |
| | Sixth step | 0.012 |
| | Seventh step | 0.012 |
| | Eighth step | 0.012 |
| Third ring zone | First step | 0.011 |
| | Second step | 0.011 |
| | Third step | 0.011 |
| | Fourth step | 0.010 |
| | Fifth step | 0.010 |
| | Sixth step | 0.010 |
| | Seventh step | 0.010 |
| | Eighth step | 0.009 |
| Fourth ring zone | First step | 0.009 |
| | Second step | 0.009 |
| | Third step | 0.009 |
| | Fourth step | 0.009 |
| | Fifth step | 0.009 |
| | Sixth step | 0.008 |
| | Seventh step | 0.008 |
| | Eighth step | 0.008 |
| Fifth ring zone | First step | 0.008 |
| | Second step | 0.008 |
| | Third step | 0.008 |
| | Fourth step | 0.008 |
| | Fifth step | 0.008 |
| | Sixth step | 0.007 |
| | Seventh step | 0.007 |
| | Eighth step | 0.007 |
| Sixth ring zone | First step | 0.007 |
| | Second step | 0.007 |
| | Third step | 0.007 |
| | Fourth step | 0.007 |
| | Fifth step | 0.007 |
| | Sixth step | 0.007 |
| | Seventh step | 0.007 |
| | Eighth step | 0.007 |
| Seventh ring zone | First step | 0.007 |
| | Second step | 0.006 |
| | Third step | 0.006 |
| | Fourth step | 0.006 |
| | Fifth step | 0.006 |
| | Sixth step | 0.006 |
| | Seventh step | 0.006 |
| | Eighth step | 0.006 |
| Eighth ring zone | First step | 0.006 |
| | Second step | 0.006 |
| | Third step | 0.006 |
| | Fourth step | 0.006 |
| | Fifth step | 0.006 |

TABLE 9-continued

| | Cycle (mm) | |
|---|---|---|
| | Sixth step | 0.006 |
| | Seventh step | 0.006 |
| | Eighth step | 0.006 |
| Ninth ring zone | First step | 0.006 |
| | Second step | 0.006 |
| | Third step | 0.006 |
| | Fourth step | 0.006 |
| | Fifth step | 0.006 |
| | Sixth step | 0.005 |
| | Seventh step | 0.005 |
| | Eighth step | 0.005 |
| Tenth ring zone | First step | 0.005 |
| | Second step | 0.005 |
| | Third step | 0.005 |
| | Fourth step | 0.005 |
| | Fifth step | 0.005 |
| | Sixth step | 0.005 |
| | Seventh step | 0.005 |
| | Eighth step | 0.005 |
| Eleventh ring zone | First step | 0.005 |
| | Second step | 0.005 |
| | Third step | 0.005 |
| | Fourth step | 0.005 |
| | Fifth step | 0.005 |
| | Sixth step | 0.005 |
| | Seventh step | 0.005 |
| | Eighth step | 0.005 |
| Twelfth ring zone | First step | 0.005 |
| | Second step | 0.005 |
| | Third step | 0.005 |
| | Fourth step | 0.005 |
| | Fifth step | 0.005 |
| | Sixth step | 0.005 |
| | Seventh step | 0.005 |
| | Eighth step | 0.005 |
| Thirteenth ring zone | First step | 0.005 |
| | Second step | 0.005 |
| | Third step | 0.005 |
| | Fourth step | 0.005 |
| | Fifth step | 0.005 |
| | Sixth step | 0.005 |
| | Seventh step | 0.005 |
| | Eighth step | 0.005 |
| Fourteenth ring zone | First step | 0.005 |
| | Second step | 0.004 |
| | Third step | 0.004 |
| | Fourth step | 0.004 |
| | Fifth step | 0.004 |
| | Sixth step | 0.004 |
| | Seventh step | 0.004 |
| | Eighth step | 0.004 |
| Fifteenth ring zone | First step | 0.004 |
| | Second step | 0.004 |
| | Third step | 0.004 |
| | Fourth step | 0.004 |
| | Fifth step | 0.004 |
| | Sixth step | 0.004 |
| | Seventh step | 0.004 |
| | Eighth step | 0.004 |
| Sixteenth ring zone | First step | 0.004 |
| | Second step | 0.004 |
| | Third step | 0.004 |
| | Fourth step | 0.004 |
| | Fifth step | 0.004 |
| | Sixth step | 0.004 |
| | Seventh step | 0.004 |
| | Eighth step | 0.004 |

On the inner part of Numerical Example 2, one ring zone cycle consists of consecutive 8-level steps. Each ring zone cycle in Table 9 indicates the width of a ring zone in a radial direction (in a direction perpendicular to the optical axis) as indicated by an arrow in FIG. 10(b). On the inner part, a first ring zone, a second ring zone, a third ring zone, . . . , and a sixteenth ring zone are provided in order from the optical axis toward the outer circumference of the objective lens element. Further, each step cycle indicates the width, in the radial direction (in the direction perpendicular to the optical axis), of a step provided in each ring zone, as indicated by an arrow in FIG. 10(b). In each ring zone, the steps are referred to as a first step, a second step, a third step, . . . , and an eighth step in order from the optical axis side toward the outer circumference.

Table 10 shows ring zone cycles of the stair-like step structure provided on the intermediate part of the first surface.

TABLE 10

| | Cycle (mm) | |
|---|---|---|
| | First ring zone | 0.016 |
| | Second ring zone | 0.016 |
| | Third ring zone | 0.016 |
| | Fourth ring zone | 0.016 |
| | Fifth ring zone | 0.016 |
| | Sixth ring zone | 0.015 |
| | Seventh ring zone | 0.015 |
| | Eighth ring zone | 0.015 |
| | Ninth ring zone | 0.015 |
| | Tenth ring zone | 0.015 |
| | Eleventh ring zone | 0.014 |
| First ring zone | First step | 0.004 |
| | Second step | 0.004 |
| | Third step | 0.004 |
| | Fourth step | 0.004 |
| Second ring zone | First step | 0.004 |
| | Second step | 0.004 |
| | Third step | 0.004 |
| | Fourth step | 0.004 |
| Third ring zone | First step | 0.004 |
| | Second step | 0.004 |
| | Third step | 0.004 |
| | Fourth step | 0.004 |
| Fourth ring zone | First step | 0.004 |
| | Second step | 0.004 |
| | Third step | 0.004 |
| | Fourth step | 0.004 |
| Fifth ring zone | First step | 0.004 |
| | Second step | 0.004 |
| | Third step | 0.004 |
| | Fourth step | 0.004 |
| Sixth ring zone | First step | 0.004 |
| | Second step | 0.004 |
| | Third step | 0.004 |
| | Fourth step | 0.004 |
| Seventh ring zone | First step | 0.004 |
| | Second step | 0.004 |
| | Third step | 0.004 |
| | Fourth step | 0.004 |
| Eighth ring zone | First step | 0.004 |
| | Second step | 0.004 |
| | Third step | 0.004 |
| | Fourth step | 0.004 |
| Ninth ring zone | First step | 0.004 |
| | Second step | 0.004 |
| | Third step | 0.004 |
| | Fourth step | 0.004 |
| Tenth ring zone | First step | 0.004 |
| | Second step | 0.004 |
| | Third step | 0.004 |
| | Fourth step | 0.004 |
| Eleventh ring zone | First step | 0.004 |
| | Second step | 0.004 |
| | Third step | 0.004 |
| | Fourth step | 0.004 |

On the intermediate part of Numerical Example 2, one ring zone cycle consists of consecutive 4-level steps. Each ring zone cycle in Table 10 indicates the width of a ring zone in the radial direction (in the direction perpendicular to the optical axis) as indicated by an arrow in FIG. 10(b). On the intermediate part, a first ring zone, a second ring zone, a third ring zone, . . . , and a eleventh ring zone are provided in order from the optical axis toward the outer circumference of the objective lens element. Further, a step cycle indicates the width, in the radial direction (in the direction perpendicular to the optical axis), of a step provided in each ring zone, as indicated by an arrow in FIG. 10(b). In each ring zone, the steps are referred to as a first step, a second step, a third step, and a fourth step in order from the optical axis side toward the outer circumference.

Table 11 shows ring zone cycles of the sawtooth-like diffraction structure provided on the outer part of the first surface.

TABLE 11

|  | Cycle (mm) |
|---|---|
| First ring zone | 0.017 |
| Second ring zone | 0.016 |
| Third ring zone | 0.015 |
| Fourth ring zone | 0.015 |
| Fifth ring zone | 0.015 |
| Sixth ring zone | 0.014 |
| Seventh ring zone | 0.013 |
| Eighth ring zone | 0.013 |
| Ninth ring zone | 0.012 |
| Tenth ring zone | 0.012 |
| Eleventh ring zone | 0.012 |
| Twelfth ring zone | 0.011 |
| Thirteenth ring zone | 0.011 |
| Fourteenth ring zone | 0.010 |
| Fifteenth ring zone | 0.010 |
| Sixteenth ring zone | 0.010 |
| Seventeenth ring zone | 0.010 |
| Eighteenth ring zone | 0.009 |
| Nineteenth ring zone | 0.009 |
| Twentieth ring zone | 0.009 |
| Twenty-first ring zone | 0.009 |
| Twenty-second ring zone | 0.008 |
| Twenty-third ring zone | 0.008 |
| Twenty-fourth ring zone | 0.008 |
| Twenty-fifth ring zone | 0.008 |
| Twenty-sixth ring zone | 0.008 |
| Twenty-seventh ring zone | 0.007 |
| Twenty-eighth ring zone | 0.007 |
| Twenty-ninth ring zone | 0.007 |
| Thirtieth ring zone | 0.007 |
| Thirty-first ring zone | 0.007 |
| Thirty-second ring zone | 0.007 |
| Thirty-third ring zone | 0.007 |
| Thirty-fourth ring zone | 0.006 |
| Thirty-fifth ring zone | 0.006 |

Each ring zone cycle in Table 11 is defined similarly to Numerical Example 1, and indicates the width of a ring zone in the radial direction (in the direction perpendicular to the optical axis) as indicated by the arrow in FIG. 4(b). On the outer part, a first ring zone, a second ring zone, a third ring zone, a fourth ring zone, . . . , and a thirty-fifth ring zone are provided in order from the optical axis toward the outer circumference of the objective lens element. Further, step heights of the sawtooth-like diffraction structure are set such that a phase difference of 3 wavelengths is provided to a light beam of a designed wavelength for BD, and a +3rd order diffracted light beam is used.

Table 12 shows step heights of the stair-like diffraction structure provided on the inner part of the first surface.

TABLE 12

|  |  | Depth (μm) |
|---|---|---|
| First ring zone | First step | 0.98 |
|  | Second step | 0.98 |
|  | Third step | 0.98 |

TABLE 12-continued

|  |  | Depth (μm) |
|---|---|---|
|  | Fourth step | 0.98 |
|  | Fifth step | 0.98 |
|  | Sixth step | 0.98 |
|  | Seventh step | 0.99 |
|  | Eighth step | 6.91 |
| Second ring zone | First step | 0.99 |
|  | Second step | 0.99 |
|  | Third step | 0.99 |
|  | Fourth step | 0.99 |
|  | Fifth step | 0.99 |
|  | Sixth step | 0.99 |
|  | Seventh step | 0.99 |
|  | Eighth step | 6.97 |
| Third ring zone | First step | 1.00 |
|  | Second step | 1.00 |
|  | Third step | 1.00 |
|  | Fourth step | 1.00 |
|  | Fifth step | 1.00 |
|  | Sixth step | 1.00 |
|  | Seventh step | 1.00 |
|  | Eighth step | 7.04 |
| Fourth ring zone | First step | 1.01 |
|  | Second step | 1.01 |
|  | Third step | 1.01 |
|  | Fourth step | 1.01 |
|  | Fifth step | 1.01 |
|  | Sixth step | 1.01 |
|  | Seventh step | 1.02 |
|  | Eighth step | 7.11 |
| Fifth ring zone | First step | 1.02 |
|  | Second step | 1.02 |
|  | Third step | 1.02 |
|  | Fourth step | 1.02 |
|  | Fifth step | 1.02 |
|  | Sixth step | 1.02 |
|  | Seventh step | 1.03 |
|  | Eighth step | 7.19 |
| Sixth ring zone | First step | 1.03 |
|  | Second step | 1.03 |
|  | Third step | 1.03 |
|  | Fourth step | 1.03 |
|  | Fifth step | 1.03 |
|  | Sixth step | 1.04 |
|  | Seventh step | 1.04 |
|  | Eighth step | 7.27 |
| Seventh ring zone | First step | 1.04 |
|  | Second step | 1.04 |
|  | Third step | 1.04 |
|  | Fourth step | 1.04 |
|  | Fifth step | 1.05 |
|  | Sixth step | 1.05 |
|  | Seventh step | 1.05 |
|  | Eighth step | 7.35 |
| Eighth ring zone | First step | 1.05 |
|  | Second step | 1.05 |
|  | Third step | 1.05 |
|  | Fourth step | 1.06 |
|  | Fifth step | 1.06 |
|  | Sixth step | 1.06 |
|  | Seventh step | 1.06 |
|  | Eighth step | 7.43 |
| Ninth ring zone | First step | 1.06 |
|  | Second step | 1.07 |
|  | Third step | 1.07 |
|  | Fourth step | 1.07 |
|  | Fifth step | 1.07 |
|  | Sixth step | 1.07 |
|  | Seventh step | 1.07 |
|  | Eighth step | 7.52 |
| Tenth ring zone | First step | 1.08 |
|  | Second step | 1.08 |
|  | Third step | 1.08 |
|  | Fourth step | 1.08 |
|  | Fifth step | 1.08 |
|  | Sixth step | 1.08 |
|  | Seventh step | 1.09 |
|  | Eighth step | 7.62 |

TABLE 12-continued

| | Depth (μm) | |
|---|---|---|
| Eleventh ring zone | First step | 1.09 |
| | Second step | 1.09 |
| | Third step | 1.09 |
| | Fourth step | 1.10 |
| | Fifth step | 1.10 |
| | Sixth step | 1.10 |
| | Seventh step | 1.10 |
| | Eighth step | 7.71 |
| Twelfth ring zone | First step | 1.10 |
| | Second step | 1.11 |
| | Third step | 1.11 |
| | Fourth step | 1.11 |
| | Fifth step | 1.11 |
| | Sixth step | 1.11 |
| | Seventh step | 1.11 |
| | Eighth step | 7.82 |
| Thirteenth ring zone | First step | 1.12 |
| | Second step | 1.12 |
| | Third step | 1.12 |
| | Fourth step | 1.12 |
| | Fifth step | 1.13 |
| | Sixth step | 1.13 |
| | Seventh step | 1.13 |
| | Eighth step | 7.93 |
| Fourteenth ring zone | First step | 1.13 |
| | Second step | 1.14 |
| | Third step | 1.14 |
| | Fourth step | 1.14 |
| | Fifth step | 1.14 |
| | Sixth step | 1.14 |
| | Seventh step | 1.15 |
| | Eighth step | 8.04 |
| Fifteenth ring zone | First step | 1.15 |
| | Second step | 1.15 |
| | Third step | 1.16 |
| | Fourth step | 1.16 |
| | Fifth step | 1.16 |
| | Sixth step | 1.16 |
| | Seventh step | 1.16 |
| | Eighth step | 8.16 |
| Sixteenth ring zone | First step | 1.17 |
| | Second step | 1.17 |
| | Third step | 1.17 |
| | Fourth step | 1.18 |
| | Fifth step | 1.18 |
| | Sixth step | 1.18 |
| | Seventh step | 1.18 |
| | Eighth step | 8.29 |

Table 13 shows step heights of the stair-like step structure provided on the intermediate part of the first surface.

TABLE 13

| | Depth (μm) | |
|---|---|---|
| First ring zone | First step | 1.18 |
| | Second step | 1.18 |
| | Third step | 1.18 |
| | Fourth step | 3.56 |
| Second ring zone | First step | 1.19 |
| | Second step | 1.19 |
| | Third step | 1.19 |
| | Fourth step | 3.59 |
| Third ring zone | First step | 1.20 |
| | Second step | 1.20 |
| | Third step | 1.20 |
| | Fourth step | 3.62 |
| Fourth ring zone | First step | 1.21 |
| | Second step | 1.21 |
| | Third step | 1.21 |
| | Fourth step | 3.65 |
| Fifth ring zone | First step | 1.22 |
| | Second step | 1.22 |
| | Third step | 1.22 |
| | Fourth step | 3.68 |

TABLE 13-continued

| | Depth (μm) | |
|---|---|---|
| Sixth ring zone | First step | 1.23 |
| | Second step | 1.23 |
| | Third step | 1.24 |
| | Fourth step | 3.72 |
| Seventh ring zone | First step | 1.24 |
| | Second step | 1.24 |
| | Third step | 1.25 |
| | Fourth step | 3.75 |
| Eighth ring zone | First step | 1.25 |
| | Second step | 1.26 |
| | Third step | 1.26 |
| | Fourth step | 3.79 |
| Ninth ring zone | First step | 1.26 |
| | Second step | 1.27 |
| | Third step | 1.27 |
| | Fourth step | 3.82 |
| Tenth ring zone | First step | 1.28 |
| | Second step | 1.28 |
| | Third step | 1.28 |
| | Fourth step | 3.86 |
| Eleventh ring zone | First step | 1.29 |
| | Second step | 1.29 |
| | Third step | 1.30 |
| | Fourth step | 3.90 |

Table 14 shows the step heights of the sawtooth-like diffraction structure provided on the outer part of the first surface.

TABLE 14

| | Depth (μm) |
|---|---|
| First ring zone | 3.18 |
| Second ring zone | 3.22 |
| Third ring zone | 3.26 |
| Fourth ring zone | 3.30 |
| Fifth ring zone | 3.33 |
| Sixth ring zone | 3.37 |
| Seventh ring zone | 3.41 |
| Eighth ring zone | 3.45 |
| Ninth ring zone | 3.49 |
| Tenth ring zone | 3.53 |
| Eleventh ring zone | 3.56 |
| Twelfth ring zone | 3.60 |
| Thirteenth ring zone | 3.64 |
| Fourteenth ring zone | 3.68 |
| Fifteenth ring zone | 3.71 |
| Sixteenth ring zone | 3.75 |
| Seventeenth ring zone | 3.78 |
| Eighteenth ring zone | 3.82 |
| Nineteenth ring zone | 3.85 |
| Twentieth ring zone | 3.88 |
| Twenty-first ring zone | 3.91 |
| Twenty-second ring zone | 3.94 |
| Twenty-third ring zone | 3.97 |
| Twenty-fourth ring zone | 4.00 |
| Twenty-fifth ring zone | 4.02 |
| Twenty-sixth ring zone | 4.04 |
| Twenty-seventh ring zone | 4.06 |
| Twenty-eighth ring zone | 4.08 |
| Twenty-ninth ring zone | 4.10 |
| Thirtieth ring zone | 4.11 |
| Thirty-first ring zone | 4.12 |
| Thirty-second ring zone | 4.13 |
| Thirty-third ring zone | 4.13 |
| Thirty-fourth ring zone | 4.13 |
| Thirty-fifth ring zone | 4.13 |

Table 15 shows condition values for the objective lens elements according to Numerical Examples 1 and 2.

TABLE 15

| Numerical Example 1 | | Numerical Example 2 | |
|---|---|---|---|
| P1a | 0.015 | P2a | 0.014 |
| P1ac | 0.004 | P2ac | 0.004 |
| P21 | 0.043 | P31 | 0.017 |
| m | 3 | m | 3 |
| n | 1 | n | 1 |
| P21/m | 0.014 | P31/m | 0.0057 |
| P2b | 0.021 | P3b | 0.006 |
| dr2 | 3.27 | dr3 | 3.18 |
| dr2/m | 1.09 | dr3/m | 1.06 |
| ds1 | 1.28 | ds2 | 1.28 |
| dA1 | 3.85 | dA2 | 3.89 |

The present invention is applicable to objective lens elements used for performing for performing at least one of recording, reproducing, or erasing of information on optical discs of a plurality of standards for which light beams having different wavelengths are used, and optical pickup devices including the objective lens elements.

While the invention has been described in detail, the foregoing description is in all aspects illustrative and not restrictive. It will be understood that numerous other modifications and variations can be devised without departing from the scope of the invention.

What is claimed is:

1. An objective lens element that has optical function surfaces on an incident side and an exit side, that converges a first incident light beam of a wavelength $\lambda_1$ through a base plate having a thickness $t_1$ to form a spot, and that converges a second incident light beam of a wavelength $\lambda_2$ longer than the wavelength $\lambda_1$ through a base plate having a thickness $t_2$ larger than the thickness $t_1$ to form a spot, wherein:

at least one of the optical function surfaces is divided into an inner part that includes a rotational symmetry axis and through which the first and second incident light beams that substantially contribute to spot formation pass, and an outer part that is a ring-shaped region surrounding the inner part and through which only the first incident light beam that substantially contributes to spot formation passes;

a plurality of stair-like diffraction structures is provided on the inner part;

a plurality of sawtooth-like diffraction structures is provided on the outer part; and, wherein:

the following condition is satisfied:

$\Delta d = a \times \lambda_1 / (n_1 - 1)$, where:

$\Delta d$ is a difference in level between a first curved surface and a second curved surface, the level difference $\Delta d$ being disposed in the vicinity of a boundary between the inner part and the outer part, the first curved surface extending at an intermediate level of recesses and projections of the stair-like diffraction structures provided on the inner part, and the second curved surface extending at an intermediate level of recesses and projections of the sawtooth-like diffraction structures provided on the outer part;

a is an integer; and $n_1$ is the refractive index of a material forming the objective lens element, with respect to the light beam of the wavelength $\lambda_1$.

2. The objective lens element according to claim 1, wherein the objective lens element satisfies the following conditions:

$3 \times P1ac < P1a < 5 \times P1ac$;

$0.3 \times P1a/n < P21/m < 1.5 \times P1a/n$; and $P21 > 2 \times P2b$, where:

P1ac is the pitch of the outermost step of the stair-like diffraction structure located at the outermost portion of the inner part;

P1a is the pitch of the stair-like diffraction structure located at the outermost portion of the inner part;

P21 is the pitch of the sawtooth-like diffraction structure located at the innermost portion of the outer part;

P2b is the pitch of the sawtooth-like diffraction structure located at the outermost portion of the outer part;

m is the diffraction order with respect to a light beam of the wavelength $\lambda_1$ incident on the outer part; and n is the diffraction order with respect to a light beam of the wavelength $\lambda_1$ incident on the inner part.

3. The objective lens element according to claim 1, wherein the objective lens element satisfies the following conditions:

$dr2/m < ds1 < dA1 < 4 \times ds1$, where:

dr2 is the depth of the sawtooth-like diffraction structure on the outer part;

dA1 is the depth of the stair-like diffraction structure on the inner part;

ds1 is the depth of a step of the stair-like diffraction structure on the inner part; and m is the diffraction order with respect to a light beam of the wavelength $\lambda_1$ incident on the outer part.

4. An optical pickup device that converges a first incident light beam of a wavelength $\lambda_1$ through a base plate having a thickness $t_1$ to form a spot and that converges a second incident light beam of a wavelength $\lambda_2$ longer than the wavelength $\lambda_1$ through a base plate having a thickness $t_2$ larger than the thickness $t_1$ to form a spot, the optical pickup device comprising:

a first light source for emitting a light beam of the wavelength $\lambda_1$;

a second light source for emitting a light beam of the wavelength $\lambda_2$;

an objective lens element according to claim 1; and a detection element for detecting a light beam reflected by an information storage medium that is an optical disc.

* * * * *